United States Patent
Buttry et al.

(10) Patent No.: US 10,147,971 B2
(45) Date of Patent: Dec. 4, 2018

(54) CHELATING IONIC LIQUIDS FOR MAGNESIUM BATTERY ELECTROLYTES AND SYSTEMS

(71) Applicants: Daniel A. Buttry, Tempe, AZ (US);
Tylan S. Watkins, Tempe, AZ (US);
Joseph Rheinhardt, Phoenix, AZ (US)

(72) Inventors: Daniel A. Buttry, Tempe, AZ (US);
Tylan S. Watkins, Tempe, AZ (US);
Joseph Rheinhardt, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 15/942,741

(22) Filed: Apr. 2, 2018

(65) Prior Publication Data
US 2018/0233781 A1      Aug. 16, 2018

Related U.S. Application Data

(63) Continuation of application No. PCT/US2016/059712, filed on Oct. 31, 2016.
(Continued)

(51) Int. Cl.
*H01M 10/05* (2010.01)
*H01M 10/0569* (2010.01)
(Continued)

(52) U.S. Cl.
CPC ..... *H01M 10/0569* (2013.01); *H01M 10/054* (2013.01); *H01M 10/0567* (2013.01);
(Continued)

(58) Field of Classification Search
None
See application file for complete search history.

(56) References Cited

U.S. PATENT DOCUMENTS

| | | |
|---|---|---|
| 2013/0209894 A1 | 8/2013 | Ryu et al. |
| 2013/0236764 A1 | 9/2013 | Hu et al. |

(Continued)

OTHER PUBLICATIONS

International Search Report and the Written Opinion of International Application No. PCT/US2016/059712 dated Feb. 14, 2017.

*Primary Examiner* — Sarah A. Slifka
*Assistant Examiner* — Haroon S. Sheikh
(74) *Attorney, Agent, or Firm* — Snell & Wilmer L.L.P.

(57) ABSTRACT

Ionic liquids suitable for use in magnesium batteries are disclosed. In an exemplary embodiment, a rechargeable magnesium battery comprises an anode electrode, a cathode electrode, and a chelating ionic liquid solution in contact therewith. The chelating ionic liquid may comprise at least one cation, at least one anion, and at least one soluble, magnesium salt. The magnesium salt may comprise $MgX_2$, wherein X comprises at least one of Cl—, Br—, I—, TFSI—, FSI—, $ClO_4$—, $BF_4$—, $PF_6$—, $RSO_3$— (wherein R consists of at least one of an alkyl or aryl group), $RCO_2$— (wherein R consists of at least one of an alkyl or aryl group), alkyl borides, alkyl borates, $AlCl_4$—, $AlX_aR_b$— (wherein the sum of subscripts a and b is 4, X consists of a halide, and R consists of at least one of an alkyl or aryl group), carboranes, or hexamethyldisilazide.

16 Claims, 23 Drawing Sheets

Related U.S. Application Data

(60) Provisional application No. 62/297,261, filed on Feb. 19, 2016.

(51) Int. Cl.
*H01M 10/054* (2010.01)
*H01M 10/0567* (2010.01)
*H01M 10/0568* (2010.01)

(52) U.S. Cl.
CPC .................. *H01M 10/0568* (2013.01); *H01M 2300/0022* (2013.01); *H01M 2300/0045* (2013.01)

(56) References Cited

U.S. PATENT DOCUMENTS

| | | |
|---|---|---|
| 2014/0211370 A1 | 7/2014 | Seymour |
| 2014/0302400 A1 | 10/2014 | Shao et al. |
| 2015/0072250 A1 | 3/2015 | Mohtadi |

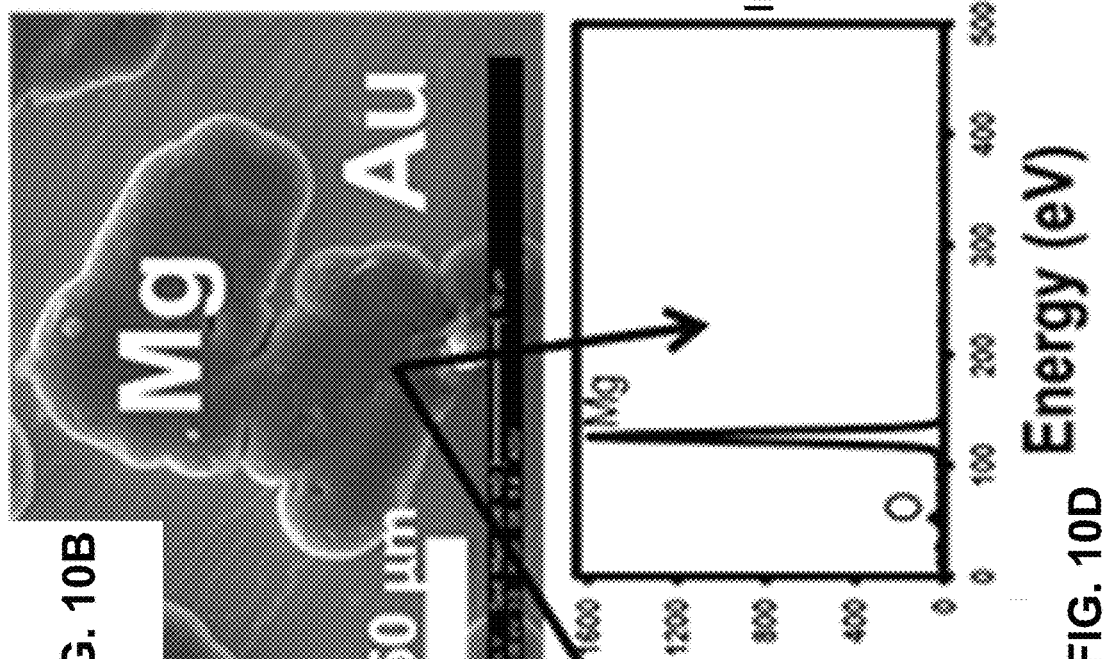
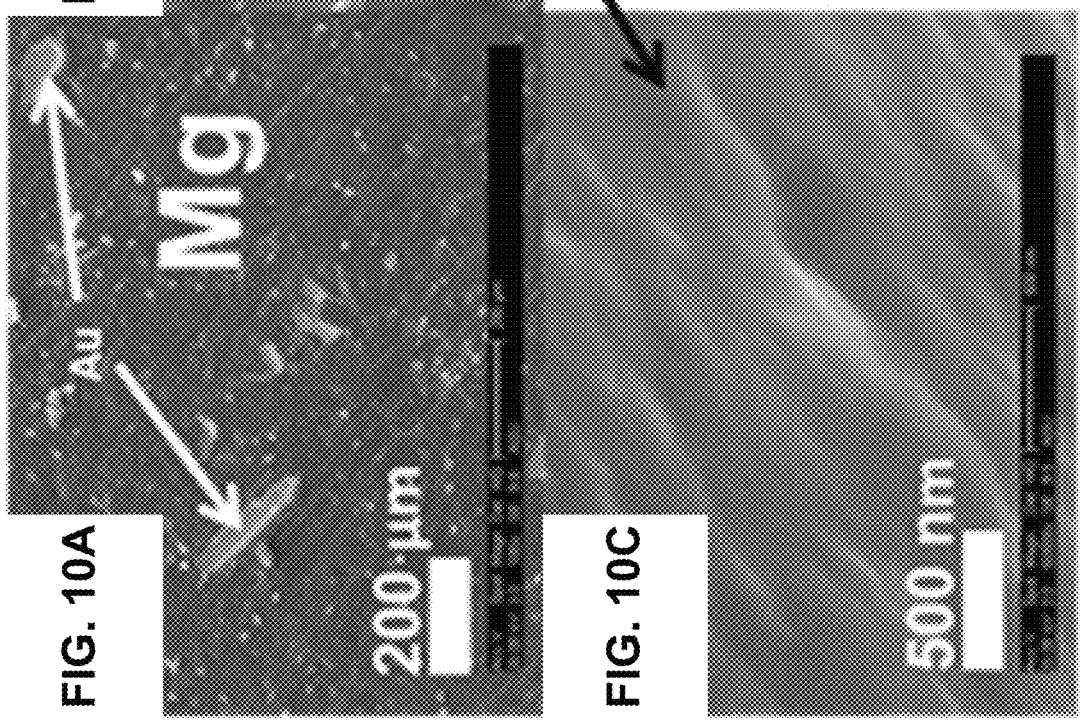
FIG. 10A  FIG. 10B  FIG. 10C  FIG. 10D

CHELATING IONIC LIQUIDS FOR MAGNESIUM BATTERY ELECTROLYTES AND SYSTEMS

CROSS-REFERENCE TO RELATED APPLICATIONS

This application is a continuation of PCT Patent Application No. PCT/US2016/059712 filed on Oct. 31, 2016, now published as WO 2017/066810 entitled "CHELATING IONIC LIQUIDS FOR MAGNESIUM BATTERY ELECTROLYTES AND SYSTEMS." PCT/US2016/059712 claims priority to, and the benefit of, U.S. Provisional Patent Application No. 62/240,678 filed on Oct. 13, 2015 entitled "CHELATING IONIC LIQUID FAMILY FOR MAGNESIUM BATTERY". PCT/US2016/059712 also claims priority to, and the benefit of, U.S. Provisional Patent Application No. 62/297,261 filed on Feb. 19, 2016 entitled "CHELATING IONIC LIQUIDS FOR MAGNESIUM BATTERY ELECTROLYTES AND SYSTEMS". The contents of all of the foregoing applications are hereby incorporated by reference for all purposes.

FEDERALLY SPONSORED RESEARCH OR DEVELOPMENT

This invention was made with Government support under Contract No. W911NF-11-1-0432 awarded by the United States Army Research Office. The U.S. Government has certain rights in the invention.

TECHNICAL FIELD

The present disclosure relates to ionic liquids for rechargeable magnesium batteries, and in particular, to rechargeable magnesium battery electrolytes and ionic liquids containing ether chelating functional groups.

BACKGROUND

The realization of reliable battery chemistries beyond the present Li-ion systems is an important goal in the field of energy conversion and storage. The theoretical metrics of a rechargeable battery using a metallic magnesium (Mg) anode (3832 mAh/cm3 volumetric and 2205 mAh/g gravimetric capacities) have motivated significant efforts to develop electrolytes and cathode materials for secondary Mg batteries. The fundamental requirement for an electrolyte to be compatible with the electro-chemistries of both the cathode and anode is not trivially met in Mg-based systems. For instance, simple Mg electrolytes analogous to those of typical Li battery chemistries have yet to show reversible electrodeposition of Mg metal. To date, most reported Mg electrolytes have been derived from organometallic sources, predominantly Grignard reagents or analogues, often in concert with AlRxCl3-x (R=alkane or aryl group) to provide increased oxidative stability. In some recent systems, the [(μ-Cl)3Mg2(THF)6]+ dimer and/or the [MgCl(THF)5+] monomer have been implicated in producing reversible electrochemical deposition and dissolution. These various systems have shown reversible electrodeposition of dendrite-free Mg with high coulombic efficiencies and reasonable oxidative stabilities. However, halide electrolytes can be corrosive toward typical current collecting metals, limiting their commercial applicability. Many Mg electrolytes also have unattractive safety characteristics due to use of Grignards and/or tetrahydrofuran (THF) in the electrolyte.

Accordingly, improved Mg battery electrolytes and electrochemical systems utilizing the same remain desirable.

SUMMARY

In various embodiments, the present disclosure includes a rechargeable magnesium battery configured with an ionic liquid medium, the battery comprising an anode electrode, a cathode electrode, and the ionic liquid medium in contact with the anode electrode and the cathode electrode. In various embodiments, the ionic liquid medium comprises at least one cation, at least one anion, and at least one magnesium (Mg) salt represented by the formula MgX2, wherein X comprises at least one of Cl—, Br—, I—, TFSI—, FSI—, ClO4-, BF4-, PF6-, RSO3- (wherein R consists of at least one of an alkyl or aryl group), RCO2- (wherein R consists of at least one of an alkyl or aryl group), alkyl borides, alkyl borates, AlCl4-, AlXaRb— (wherein the sum of subscripts a and b is 4, X consists of a halide, and R consists of at least one of an alkyl or aryl group), carboranes, or hexamethyldisilazide.

In various embodiments, the chelating ionic liquid further comprises a polyether chain. In various embodiments, a concentration of oxygen atoms in the polyether chain comprises a molar ratio of between 3 and 6 per Mg2+ atom in the chelating ionic liquid. In various embodiments, the polyether chain comprises diglyme. In various embodiments, the polyether chain comprises a pendant chain coupled to the cation. In various embodiments, the cation comprises N-methoxyPEGm-N-methylpyrrolidinium cations, wherein PEG comprises a polyethylene glycol chain, and m comprises the number of ether oxygen's in the PEG chain. In various embodiments, the anion comprises at least one of bis(trifluoromethylsulfonyl)imide (TFSI), bis(fluorosulfonyl)imide (FSI—), IIIX4- (III=B, Al, Ga, In; X=H, F, Cl, Br, I), AF6-(A=P, As, Sb), imidazole-based anions, sulfonate-based anions, carboxylate-based anions, borate-based anions, carborane-based anions, or cyanamide-based anions. In various embodiments, a concentration of BH4- is at least as high as a concentration of water in the chelating ionic liquid.

In various embodiments, the present disclosure provides an electrolyte comprising at least one cation, at least one anion, and at least one, soluble, magnesium salt selected from the group consisting of MgX2, wherein X comprises at least one of Cl—, Br—, I—, TFSI—, FSI—, ClO4-, BF4-, PF6-, RSO3- (wherein R consists of at least one of an alkyl or aryl group), RCO2- (wherein R consists of at least one of an alkyl or aryl group), alkyl borides, alkyl borates, AlCl4-, AlXaRb—(wherein the sum of subscripts a and b is 4, X consists of a halide, and R consists of at least one of an alkyl or aryl group), carboranes, or hexamethyldisilazide.

In various embodiments, the electrolyte further comprises a polyether chain. In various embodiments, a concentration of oxygen atoms in the polyether chain comprises a molar ratio of between 3 and 6 per Mg2+ atom in the chelating ionic liquid. In various embodiments, the polyether chain comprises diglyme. In various embodiments, the polyether chain comprises a pendant chain coupled to the cation. In various embodiments, the cation comprises N-methoxyPEGm-N-methylpyrrolidinium cations, wherein PEG comprises a polyethylene glycol chain, and m comprises the number of ether oxygen's in the PEG chain. In various embodiments, the anion comprises at least one of bis(trifluoromethylsulfonyl)imide (TFSI), bis(fluorosulfonyl)imide (FSI—), IIIX4- (III=B, Al, Ga, In; X=H, F, Cl, Br, I), AF6- (A=P, As, Sb), imidazole-based anions, sulfonate-based anions, carboxylate-based anions, borate-based anions, carborane-based anions, or cyanamide-based anions. In various embodiments, a concentration of BH4- is at least as high as a concentration of water in the chelating ionic liquid.

In various embodiments, the present disclosure provides an electrolyte comprising at least one chelating ionic liquid. In various embodiments, the chelating ionic liquid comprises N-methoxyPEGm-N-methylpyrrolidinium cations, wherein PEG comprises a polyethylene glycol chain, and m comprises the number of ether oxygen's in the PEG chain, at least one of bis(trifluoromethylsulfonyl)imide (TFSI), bis(fluorosulfonyl)imide (FSI—), IIIX4- (III=B, Al, Ga, In; X=H, F, Cl, Br, I), AF6- (A=P, As, Sb), imidazole-based anions, sulfonate-based anions, carboxylate-based anions, borate-based anions, carborane-based anions, or cyanamide-based anions, and at least one magnesium salt selected from the group consisting of MgX2, wherein X comprises at least one of Cl—, Br—, I—, TFSI—, FSI—, ClO4-, BF4-, BH4-, PF6-, RSO3- (wherein R consists of at least one of an alkyl or aryl group), RCO2- (wherein R consists of at least one of an alkyl or aryl group), alkyl borides, alkyl borates, AlCl4-, AlXaRb— (wherein the sum of subscripts a and b is 4, X consists of a halide, and R consists of at least one of an alkyl or aryl group), or hexamethyldisilazide. In various embodiments, the at least one magnesium salt is dissolved in the chelating ionic liquid.

BRIEF DESCRIPTION OF THE DRAWINGS

With reference to the following description and accompanying drawings:

FIGS. 10A, 10B, and 10C illustrate three scanning electron micrograph (SEM) images of a sample portion, and FIG. 10D illustrates an energy-dispersive x-ray spectroscopy (EDS) spectrum for a sample portion, in accordance with various embodiments;

DETAILED DESCRIPTION

Figure 1A:
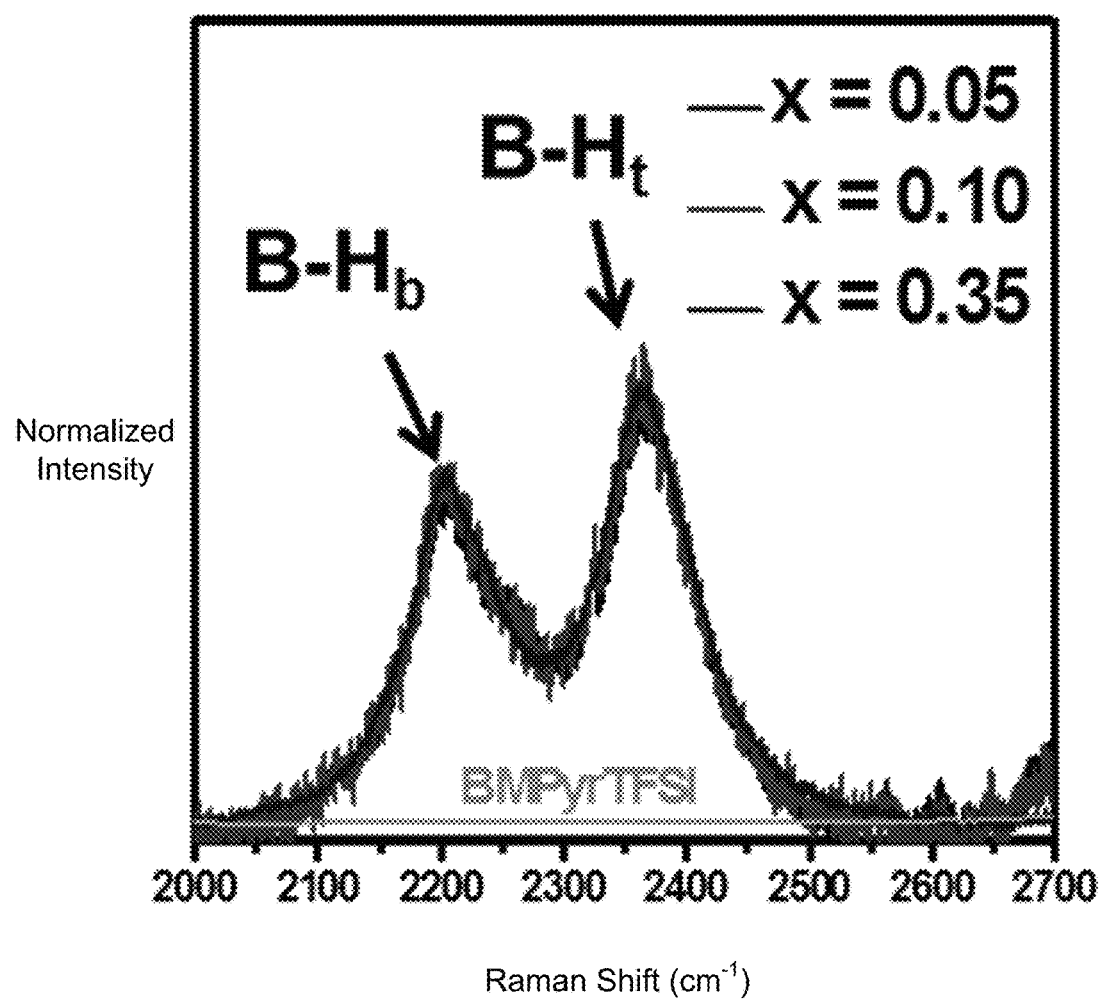
FIG. 1A illustrates Raman spectra for BMPyrTFSI, each spectrum normalized using the 2200 cm-1 peak, in accordance with various embodiments.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, conventional techniques for electrochemistry including reversible electrodeposition, dissolution, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical system or method for the use of chelating ionic liquid to facilitate reversible electrodeposition and dissolution of magnesium metal from electrodes.

The present disclosure may be applied to any composition, system, or method for the use of a chelating ionic liquid to facilitate reversible electrodeposition and dissolution of magnesium metal from electrodes. The present disclosure may be applied to a solution for use in an electrochemical cell, and/or an electrochemical cell which may be used as a battery. In various embodiments, the present disclosure may include electrochemical cell materials and methods of preparing electrochemical cells.

Chelating ionic liquids may be used for chelating a magnesium salt or ion. Chelating ionic liquid(s) may be liquid, gels, or solids at room temperature, but will generally form a liquid below 100° C. Chelating ionic liquids may be thermally stable with little to no measurable vapor pressure below 100° C., and often to temperatures well above 100° C.

In various embodiments, chelating ionic liquids may comprise a neutral polyether chain. The neutral polyether chain may comprise a short chain polyether solvent such as polyethylene glycol. In various embodiments, the neutral polyether chain may comprise diglyme. A general molecular structure of diglyme may comprise:

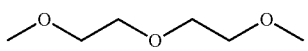

In various embodiments, a desired concentration of neutral polyether chain in the chelating ionic liquid may be determined by the ratio of oxygen atoms in the polyether chains per Mg2+ in the medium. In various embodiments, three oxygens may inhibit the electrolyte medium from reacting with the Mg+ intermediate. Thus, in various embodiments, the polyether concentration may provide a molar ratio of between three and six oxygens per Mg2+ in the chelating ionic liquid. In various embodiments, the polyether concentration may provide a molar ratio of more than six oxygens per Mg2+ in the chelating ionic liquid. However, the neutral polyether chain may comprise any suitable concentration.

In various embodiments, the neutral polyether chain may comprise PEGm, where PEG=polyethylene glycol chain, and m=the number of ether oxygen's in the PEG chain. In various embodiments, the neutral polyether chain may comprise a polythioether, where oxygen in the polyether is substituted by either sulfur (S). In various embodiments, the oxygen in the polyether may be substituted with nitrogen coupled to a pendant group (NR). In various embodiments, the oxygen in the polyether may be substituted with phosphorous coupled to a pendant group (PR).

In various embodiments, chelating ionic liquids may comprise one or more functional groups attached to an ionic liquid cation. In various embodiments of the present disclosure, the cation of the chelating ionic liquid comprises one or more pendant chains. In various embodiments, a desired concentration of the cation in the chelating ionic liquid may be determined by the ratio of oxygen atoms in the pendant chain per Mg2+ in the medium. In various embodiments, the cation concentration may provide a molar ratio of between three and six pendant chain oxygens per Mg2+ in the chelating ionic liquid. In various embodiments, the cation concentration may provide a molar ratio of more than six pendant chain oxygens per Mg2+ in the chelating ionic liquid. However, the cation may comprise any suitable concentration.

In various embodiments, the pendant chain may comprise a polyether chain. Stated differently, in some embodiments of the present disclosure, a polyether chain may be attached to the ionic liquid cation, and in other embodiments, a neutral polyether chain may not be attached to the ionic liquid cation. In various embodiments, the pendant chain may comprise a polyalkylamine. The fact that the chain is pendent from the cation of the chelating ionic liquid may reduce volatility or prevent the complexing agent from being volatile, as it would be if, for example, a neutral polyether chain were simply added.

In various embodiments, the neutral polyether chain and/or the pendant chain may prevent or disrupt direct interactions of the Mg2+ species with the anions in the chelating ionic liquid. Interactions between the Mg2+ species with the anions in the chelating ionic liquid may impede decomplexation of Mg2+ from the anions, which is desirable for facile reduction to make Mg metal or insertion/incorporation of Mg2+ into/with the cathode material. These interactions may also cause unwanted reactions between various magnesium species and the anions. Accordingly, in various embodiments, the neutral polyether chain and/or the pendant chain may facilitate facile reduction to make Mg metal or insertion/incorporation of Mg2+ into/with the cathode material.

In various embodiments, the chelating ionic liquid may comprise cations and anions. The cations may comprise N-methoxyPEGm-N-methylpyrrolidinium, where PEG=polyethylene glycol chain, and m=the number of ether oxygen's in the PEG chain. The anions may comprise bis(trifluoromethylsulfonyl)imide (TFSI). However, present disclosure is not limited to pyrrolidinium-based cations and TFSI— anions. In various embodiments, the cations may comprise any suitable cations, including ammonium, pyridinium, imidazolium or phosphonium groups. In various embodiments, the cations may contain more than one pendent chelating chain.

In various embodiments, the anions may comprise any suitable anions, including bis(fluorosulfonyl)imide (FSI—), IIIX4- (III=B, Al, Ga, In; X=H, F, Cl, Br, I), AF6- (A=P, As, Sb), or any imidazole-based, carboxylate-based, sulfonate-based, borate-based, carborane-based, or cyanamide-based anions. In various embodiments, the concentration of anion in the chelating ionic liquid may be determined by the amount of trace water concentration in the chelating ionic liquid. In various embodiments, the concentration of anion may be equal to the trace water concentration. In various embodiments, the concentration of anion may be greater than the trace water concentration. However, the anion may comprise any suitable concentration.

In various embodiments, a general molecular structure for the chelating ionic liquid, also referred to herein as a PEGylated ionic liquid, may comprise:

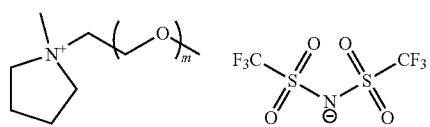

However, the chelating ionic liquid may comprise cations and anions that are not pyrrolidinium-based cations or TFSI— anions.

In various embodiments, ionic liquid cations are synthesized in which methoxy terminated polyethylene glycol (PEG) chains are made pendent on methylpyrrolidinium cations (labeled MPEGmPyr+ where M=methyl, m=number of ether oxygens in the PEG chain and Pyr=pyrrolidinium) in ionic liquids containing bis(trifluoromethylsulfonyl)imide (TFSI—) anions as the counterion. These task specific ionic liquids containing PEGylated cations are shown to chelate Mg2+ and are therefore termed "chelating ionic liquids."

In various embodiments, principles of the present disclosure utilize a cathode. In various embodiments, solutions were compatible with Mg2+ insertion into a Mo6S8 Chevrel cathode. However, the present disclosure is not limited to any particular cathode phase, and the systems and methods disclosed herein may comprise any suitable cathode phase, in addition to Chevrel. In various embodiments, the cathode phase may comprise Prussian Blue. In various embodiments, the cathode phase may comprise other cathode materials, for example, MnO3, V2O5, MoS2, MnO2, sulfur, or other metal oxides and metal silicates such as, MgxMSiO4 where x is variable and M is Co, Mn or Fe. A feature of principles of the present disclosure is that the complexation of the Mg2+ with the pendant chain prevents close association of Mg2+ with anionic species. These close associations are kinetically difficult to break up, leading to difficult and slow insertion/incorporation of Mg2+ into/with cathode materials. The non-limiting representative embodiments disclosed herein benefit from these properties.

In various embodiments, oxidative stability can affect the choice of cathode material and current collector. The potential of oxidation varies with the chosen electrode. For example, in an embodiment utilizing Mg(BH4)2/MPEG7PyrTFSI electrolyte, the electrolyte was found to be most stable toward oxidation on stainless steel 316 followed by glassy carbon. It was least stable on the two noble metal electrodes used (Pt and Au).

In various embodiments, the present disclosure contemplates electrochemical systems, for example a battery, comprising an anode. The anode may comprise a metallic magnesium. The battery may be assembled in any suitable manner known to those in the art. In an embodiment where the battery is assembled uncharged, Mg is present in Mg2+ state and thereafter deposited as Mg metal. In various embodiments, magnesium used as the anode may comprise battery-grade purity. Other anode materials may also be used, including copper, aluminum, various stainless steels and the like, as known to those skilled in the battery arts.

Principles of the present disclosure may be applied to any system or method for the use of a chelating ionic liquid to facilitate reversible electrodeposition and dissolution of magnesium metal from electrodes. In various embodiments, the chelating ionic liquid may dissolve a magnesium salt. In various embodiments, the magnesium salt may comprise Mg(BH4)2. In various embodiments, the magnesium salt may comprise a MgX2 composition, where X comprises at least one of Cl—, Br—, I—, TFSI—, FSI—, ClO4-, BF4-, PF6-, RSO3- (i.e. sulfonates, where R is an alkyl or aryl group), alkyl borides, alkyl borates, AlCl4-, AlXaRb— (where the sum of subscripts a and b is 4, X is a halide, and R is an alkyl or aryl group), carboranes, or hexamethyldisilazide. In various embodiments, the magnesium salt may comprise a borate-based salt, for example, Mg(BR4)2. In various embodiments, the magnesium salt may comprise organometallic complexes such as Rm, (RO)mMgX2-m+ AX3-nR'n (A=Al, B; X=F—, Cl—, Br—; R=alkyl or aryl group; 3≥n≥0; 2≥m≥0). In various embodiments, Grignard systems and systems derived from Grignards would also benefit from application of principles of the present disclosure. Grignards are generally formulated as RMgX, (where R is an alkyl or aryl group and X is a halide). In various embodiments, mixtures of Mg salts (i.e. MgX2) and Grignards may be prepared. In various embodiments, magnesium carborane salts may be used.

In various embodiments, the electrolyte may comprise a supporting salt, in addition to those listed above, such as a Li, Na, or Ca salt. The supporting salt may act as a dual metal ion electrolyte.

In various embodiments, chelating ionic liquids bearing pendent polyether chains designed to complex Mg2+ from a Mg(BH4)2 source are disclosed. This complexation may change the speciation of Mg2+ in these media. In various embodiments, polyether complexation may prevent TFSI— coordination at Mg2+. Polyether complexation may generate free BH4- for the Mg(BH4)2/MPEG7PyrTFSI ionic liquid. These PEGylated ionic liquid electrolytes may result in Mg deposition/dissolution with high CE and very high current density.

Figure 1B:
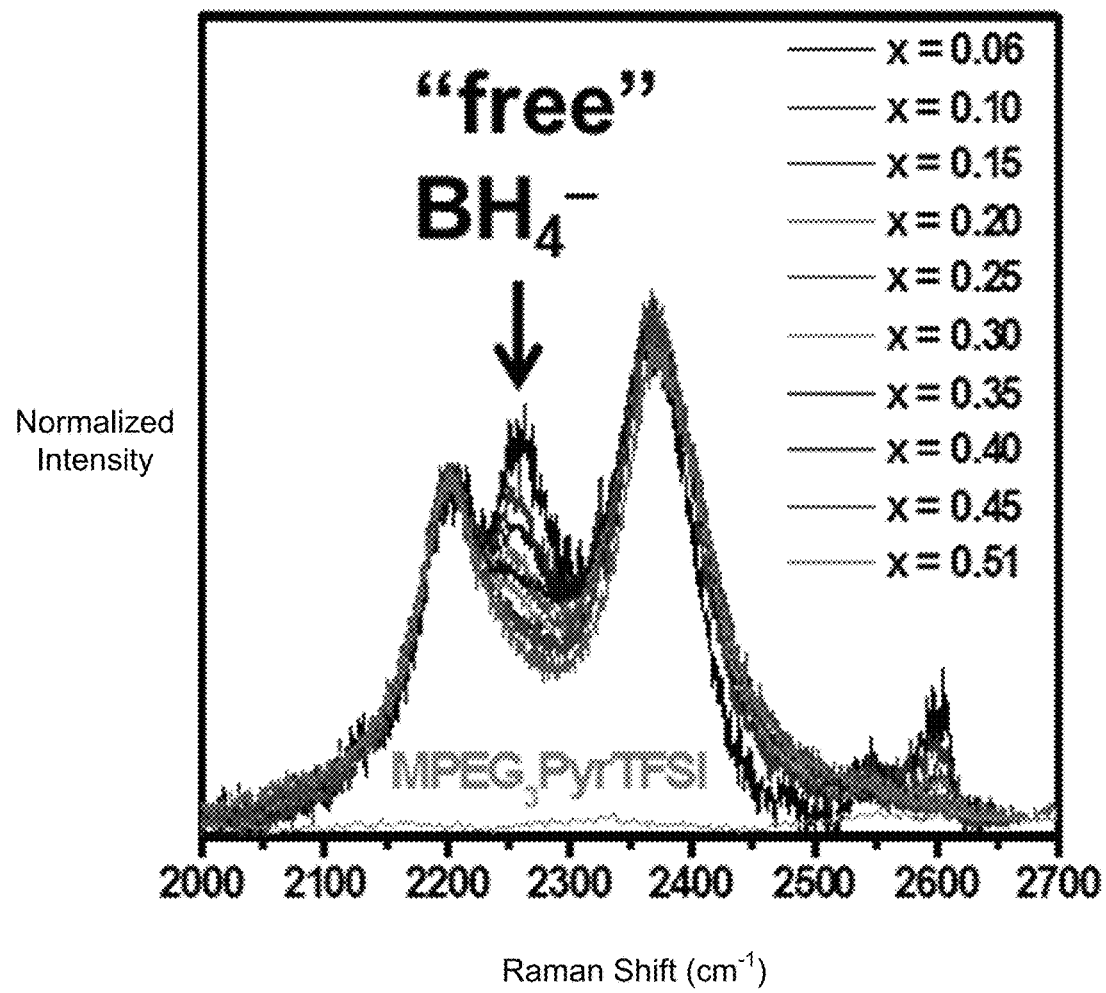
FIG. 1B illustrates Raman spectra for MPEG3PyrTFSI, each spectrum normalized using the 2200 cm-1 peak, in accordance with various embodiments.
Figure 1C:
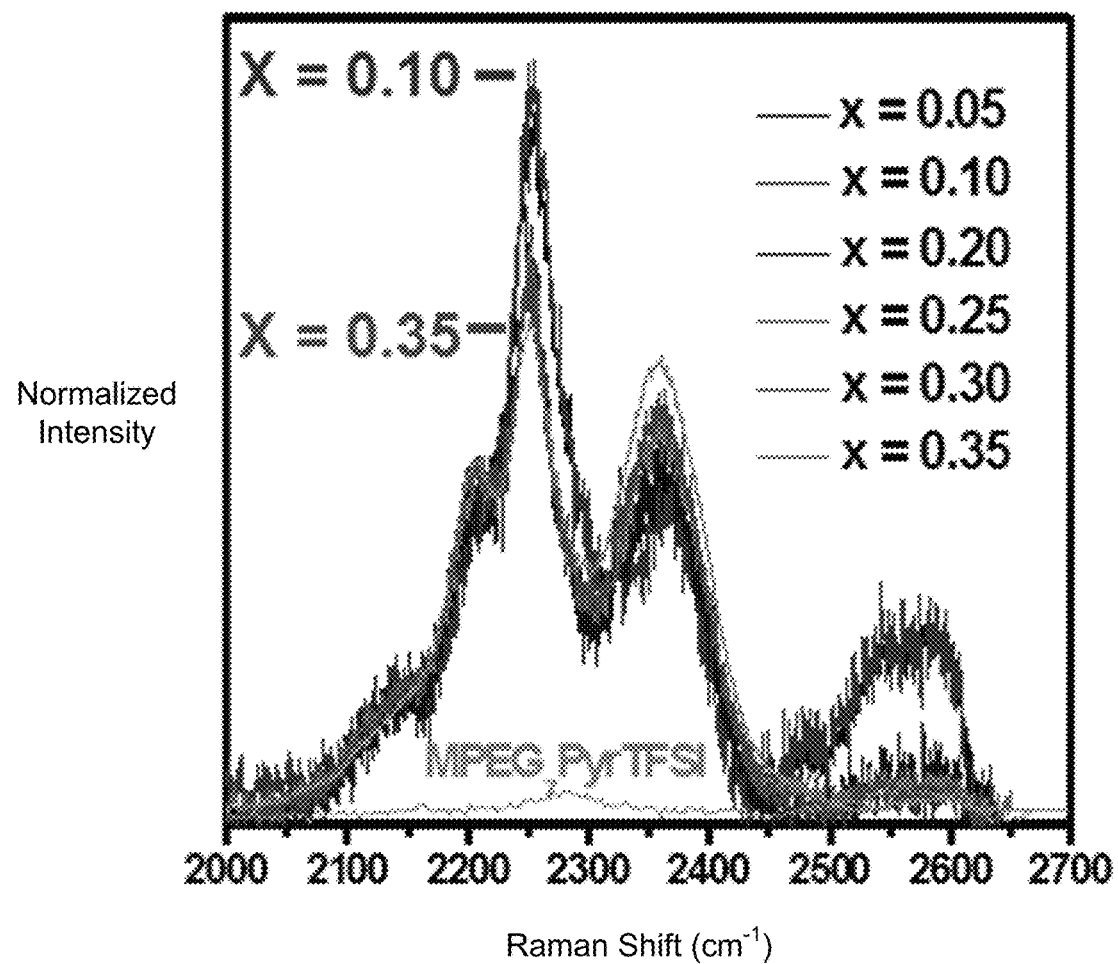
FIG. 1C illustrates Raman spectra for MPEG7PyrTFSI, each spectrum normalized using the 2200 cm-1 peak, in accordance with various embodiments.

In various embodiments containing only TFSI— anions and no ether or polyether solvents, Mg2+ is typically found as Mg(TFSI)3-. If polyether solvents or ionic liquid cations bearing pendent polyether chains are added, for example, such that the molar ratio of total number of ether oxygens to Mg2+ is large (e.g. >5 or 6), the ether oxygens displace TFSI—, producing free TFSI— and Mg2+ bound in a neutral coordination environment of ether oxygens. The number of ether oxygens needed to fully displace all TFSI— anions depends on the length of the polyether chain and its relative concentration. For polyether solvents, TFSI— displacement improves the electrochemical behavior of the Mg2+/Mg redox system considerably. Referring to FIGS. 1A through 1C, the data suggest substantial displacement of at least one of the bound BH4- anions when a sufficient number of polyether oxygens is present. In this example embodiment, one possible speciation for Mg2+ would be [(PEG)Mg(BH4)]+, where PEG represents a generic polyether chain or chains. These results suggest that exemplary embodiments of PEGylated ionic liquids provide a coordination environment conducive to reversible Mg2+/Mg electrochemistry.

In various embodiments, the source of Mg2+ may comprise Mg(BH4)2, rather than Mg(TFSI)2. As shown above, when Mg(BH4)2, for example, is dissolved in ionic liquids containing TFSI—, some TFSI— coordination will occur. The predominant speciation for Mg2+ may be [Mg(BH4)2TFSI]-. As illustrated, if polyether chains pendent on ionic liquid cations are present, TFSI— will be displaced. If the ratio of ether oxygen's to Mg2+ is sufficiently high, there is also significant displacement of BH4- from the Mg2+ center.

Preparation of a non-limiting exemplary embodiment of the present disclosure may be achieved through use of the following chemicals prepared accordingly. Lithium bis(trifluorosulfonyl)imide (99.5% TCI America), sodium iodide (99.5% EMD Millipore), 4-toluensulfonyl chloride (≥98% Oakwood Chemical), iodobutane (synthetic grade EMD Millipore), isopropyl alcohol (IPA) (99.7% Alfa Aesar), triethylene glycol monomethyl ether (≥97% Sigma Aldrich), sodium thiosulfate (99% Sigma Aldrich), activated carbon (decolorizing, Sigma Aldrich) and methoxypolyethylene glycol M.W. 350 (reagent grade Sigma Aldrich) may be used as received. Prior to use in their respective reactions, ethyl acetate (99.5% BDH), N-methyl pyrrolidine (97% Sigma Aldrich), pyridine (≥99% Sigma Aldrich) and dichloromethane (reagent grade BDH) may be distilled over CaH2. Acetone (Sigma Aldrich) may be dried via 3 Å molecular sieves prior to a single distillation before use. Toluene (Lab Chem Inc.) may be distilled over sodium and benzophenone prior to use.

In at least one non-limiting exemplary embodiment of the present disclosure, 1-(2-(2-(2-Methoxyethoxy)ethoxy)ethyl)-1-methylpyrrolidinium bis(trifluoromethylsulfonyl)imide (MPEG3PyrTFSI) may be synthesized according to a scaled up synthesis taken from Dobbin et al. (Dobbelin, M.; Azcune, I.; Luzuriaga, A. R. De; Genua, A.; Jovanovski, V.; Odriozola, I.; Chem. Mater. 2012, 24, 1583-1590.). Work up of the PEG3I may be best performed using a 5% aqueous solution of sodium thiosulfate, as described below for synthesis of MPEG7PyrTFSI. Synthesis may also differ from the Dobbin technique with the additional step of dissolving the final product in a small volume of IPA and stirring over activated charcoal at 40° C. overnight for purification. In this non-limiting exemplary embodiment, the final product is a lightly yellow-tinted, or clear, liquid. MPEG3PyrTFSI: 1H NMR (400 MHz, (CD3)2CO): δ 4.06-4.01 (m, 2H, NCH2CH2O), 3.78-3.74 (m, 6H, NCH2), 3.69-3.65 (m, 2H, OCH2CH2O), 3.63-3.6 (m, 4H, OCH2CH2O), 3.58-3.56 (m, 2H, OCH2CH2O), 3.48-3.45 (m, 2H, OCH2CH2O), 3.29 (s, 3H, OCH3), 3.28 (s, 3H, NCH3), 2.33-2.27 (m, 4H, CH2CH2).

In at least one embodiment of the present disclosure, Methoxypolyethylene glycol (M.W. 350) bis(trifluoromethylsulfonyl)imide(MPEG7PyrTFSI) may be synthesized according to the general procedure found in Ganapatibholta et. al. and adapted for pyrrolidinium-based cations as opposed to imidazolium cations. (Ganapatibhotla, L. V. N. R.; Zheng, J.; Roy, D.; Krishnan, S.; Chem. Mater. 2010, 22, 6347-6360.). In at least one exemplary embodiment, 4-toluensulfonyl chloride in dichloromethane may be added dropwise to a solution of methoxypolyethylene glycol M.W. 350 and pyridine in dichloromethane at 0° C. to −10° C. and subsequently allowed to gradually warm back to room temperature as the reaction progresses overnight. After workup of the PEGylated tosyl (PEG7 Ts) product, described by Ganapatibhotla et al., NaI powder may be slowly added to PEG7TS/acetone at room temperature and allowed to react overnight. The PEGylated iodide (PEG7I) product may then be worked up, again as described by Ganapatibhotla et al., by three 50 mL extractions using a 5% aqueous solution of sodium thiosulfate. The PEG7I/toluene may then be added to methylpyrrolidine and allowed to react at room temperature, for example for 2 days. The resulting MPEG7PyrI ionic liquid may then be separated from the toluene organic phase and extracted 3 times with 50 ML or diethyl ether. It may then be dissolved in water and stirred with decolorizing activated carbon overnight. Finally, after filtering the carbon, the MPEG7PyrI may be combined with LiTFSI in water to give MPEG7PyrTFSI. The MPEG7PyrTFSI may be diluted with IPA and stirred in activated charcoal at 40° C. overnight for final purification. The ionic liquid may then be dried, for example at 80° C., under 0.4 mTorr vacuum, for ≥17 hours prior to use. According to this embodiment, the final product was a clear liquid. MPEG7PyrTFSI: 1H NMR (400 MHz, (CD3)2CO): δ 4.10-4.05 (m, 2H, NCH2CH2O), 3.79-3.77 (m, 6H, NCH2), 3.70-3.68 (m, 2H, OCH2CH2O), 3.63-3.6 (m, 4H, OCH2CH2O), 3.58-3.56 (m, 2H, OCH2CH2O), 3.48-3.45 (m, 2H, OCH2CH2O), 3.29 (s, 3H, OCH3), 3.28 (s, 3H, NCH3), 2.33-2.27 (m, 4H, CH2CH2).

FIG. 1A shows the spectrum for an exemplary embodiment of the present disclosure comprising an ionic liquid containing Mg(BH4)2 dissolved at various mole fractions in BMPyrTFSI. Raman bands are observed at 2200 cm-1 and 2363 cm-1. The spectrum in FIG. 1A illustrates that all BH4- anions are coordinated in a bidentate fashion to the Mg2+ cation. These same spectral features are observed over a range of mole fractions of Mg(BH4)2 from 0.05 to 0.35, indicating that BH4- coordination at Mg2+ may not change over that range.

FIG. 1B shows the same spectral region for an additional exemplary embodiment comprising an ionic liquid containing Mg(BH4)2 dissolved in MPEG3PyrTFSI, over a range of mole fractions. An additional Raman band is observed at 2254 cm-1. This band is more intense, relative to the B-Hb and B-Ht bands, at low mole fractions of Mg(BH4)2.

FIG. 1C shows the same spectral region for an exemplary embodiment comprising an ionic liquid containing Mg(BH4)2 dissolved in MPEG7PyrTFSI. A similar band is observed over the entire mole fraction range explored. The band intensity is higher relative to the B-Hb and B-Ht bands at lower mole fraction of Mg(BH4)2. This band may be due to "free" BH4- (i.e. not coordinated to Mg2+).

Figure 2:
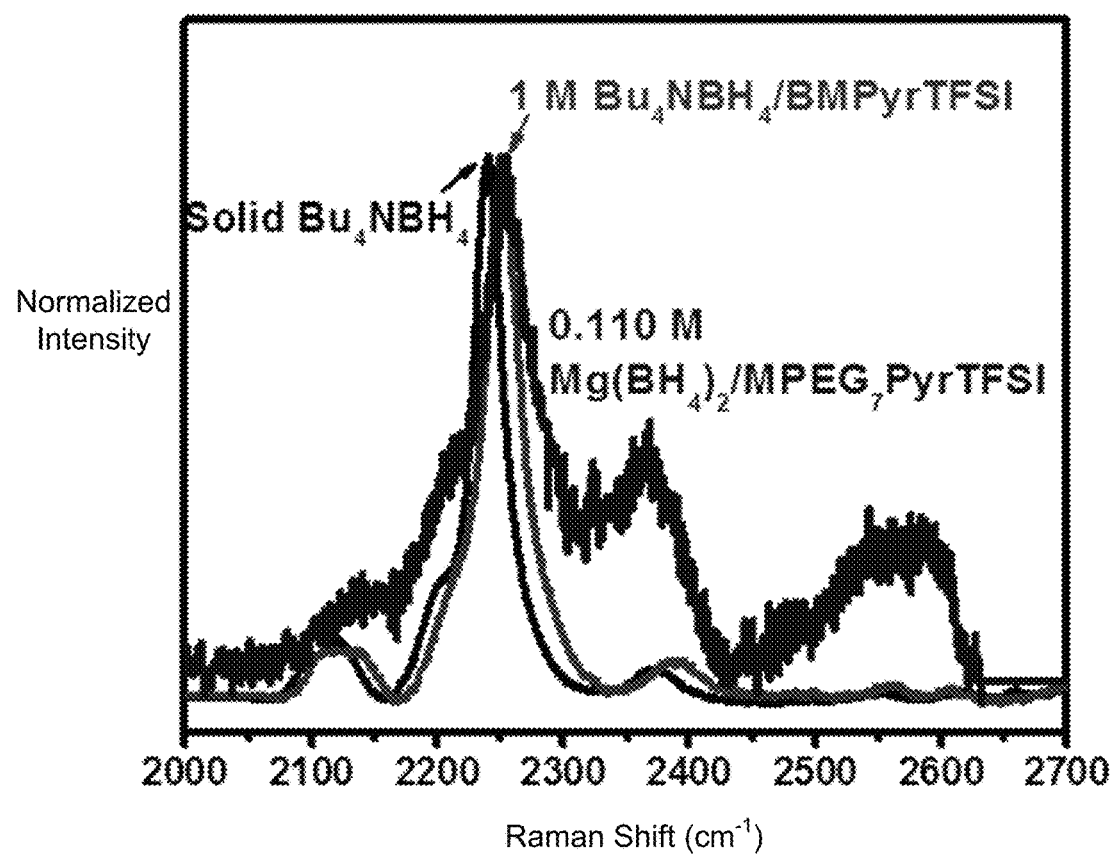
FIG. 2 illustrates Raman spectra for solid Bu4NBH4, 1 M Bu4NBH4/BMPyrTFSI, and 0.110 M Mg(BH4)2/MPEG7PyrTFSI, each spectrum normalized to its most intense peak, in accordance with various embodiments.

FIG. 2 illustrates the Raman spectrum of an exemplary embodiment comprising solid tetrabutylammonium borohydride (Bu4NBH4), 1 M Bu4NBH4 dissolved in BMPyrTFSI and 0.110 M Mg(BH4)2 dissolved in MPEG7PyrTFSI. As shown, solid Bu4NBH4 shows a peak at 2250 cm-1. 1 M Bu4NBH4 in BMPyrTFSI gives a peak at 2254 cm-1, as does 0.110 M (x=0.05) Mg(BH4)2 in MPEG7PyrTFSI. These results show that some BH4- is displaced from the Mg2+ center in these PEGylated ionic liquids, with the extent of displacement increasing with the length of the polyether chain. This is consistent with conclusions from previous studies of Mg(BH4)2 in glyme solvents, and in a polyethylene oxide polymer matrix, which also suggested that some BH4- dissociation was being caused by complexation from ether oxygens. This displacement of BH4- impacts the electrochemical deposition/dissolution of the Mg2+/Mg redox couple, generally improving the electrochemical behavior.

As shown by a comparison of FIGS. 1B and 1C, longer PEG chains in the latter are more effective at inducing displacement of the BH4-, as judged by the much more intense band for free BH4- in MPEG7PyrTFSI.

Figure 3A:
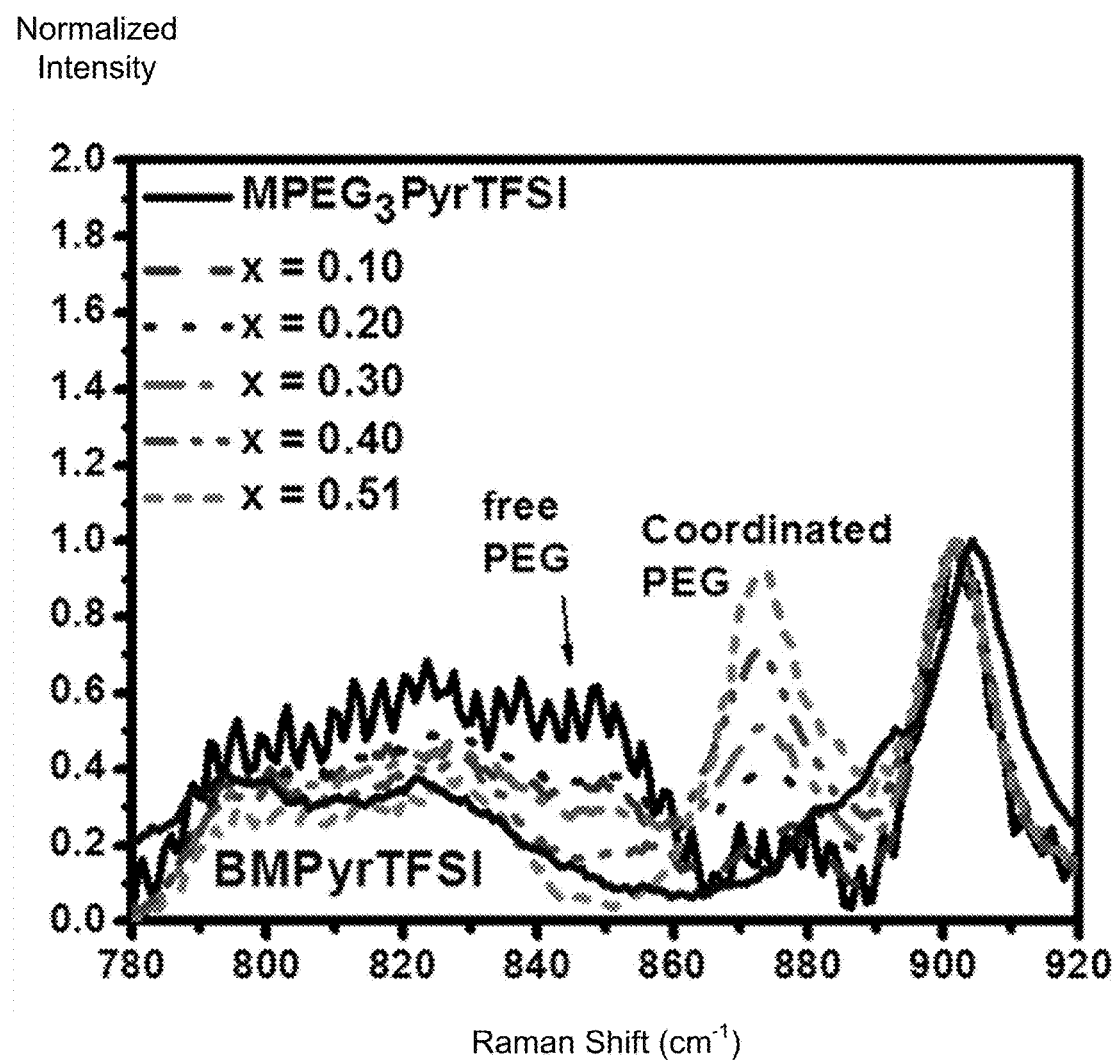
FIG. 3A illustrates C—O—C stretching and CH2 rocking regions for [Mg(BH4)2]x[MPEG3PyrTFSI]1–x, each spectrum normalized to its respective ca. 902 cm-1 (Pyr+) peak, in accordance with various embodiments.
Figure 3B:
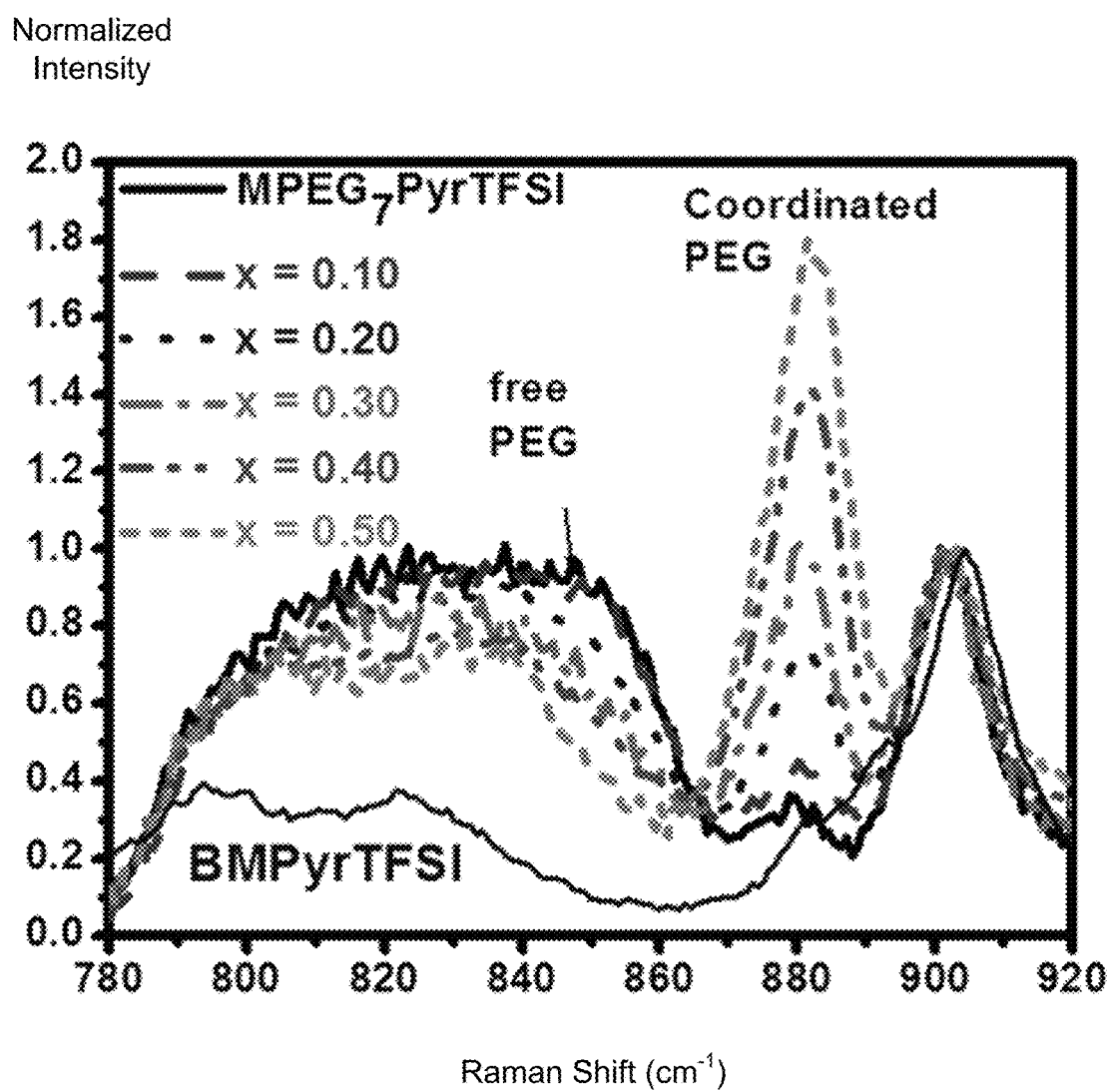
FIG. 3B illustrates C—O—C stretching and CH2 rocking regions for [Mg(BH4)2]x[MPEG7PyrTFSI]1–x, each spectrum normalized to its respective ca. 902 cm-1 (Pyr+) peak, in accordance with various embodiments.

FIG. 3A and FIG. 3B illustrate the spectral region bands associated with CH2 rocking and C—O—C stretching modes for the PEG-ionic liquid systems. For example, during analysis of this region as a function of Mg(BH4)2 mole fraction (x) in [Mg(BH4)2]x[MPEGmPyrTFSI]1-x solutions. At more dilute concentrations of Mg(BH4)2, and in the pure PEG-IL, the dominant bands are those that make up the broad feature from 780 to 860 cm-1. These vibrational modes are attributed to the non-coordinating (free) PEG chains. The peak arising at 875 cm-1 is produced when the PEG chains are coordinated to Mg2+. Mg2+ coordination also causes the broad feature due to vibrations from unbound polyether C—O—C groups to decrease. The present results show that the PEG chains do in fact chelate the Mg2+ species, despite the close proximity of the positive charge from the parent pyrrolidinium moiety.

Figure 4A:
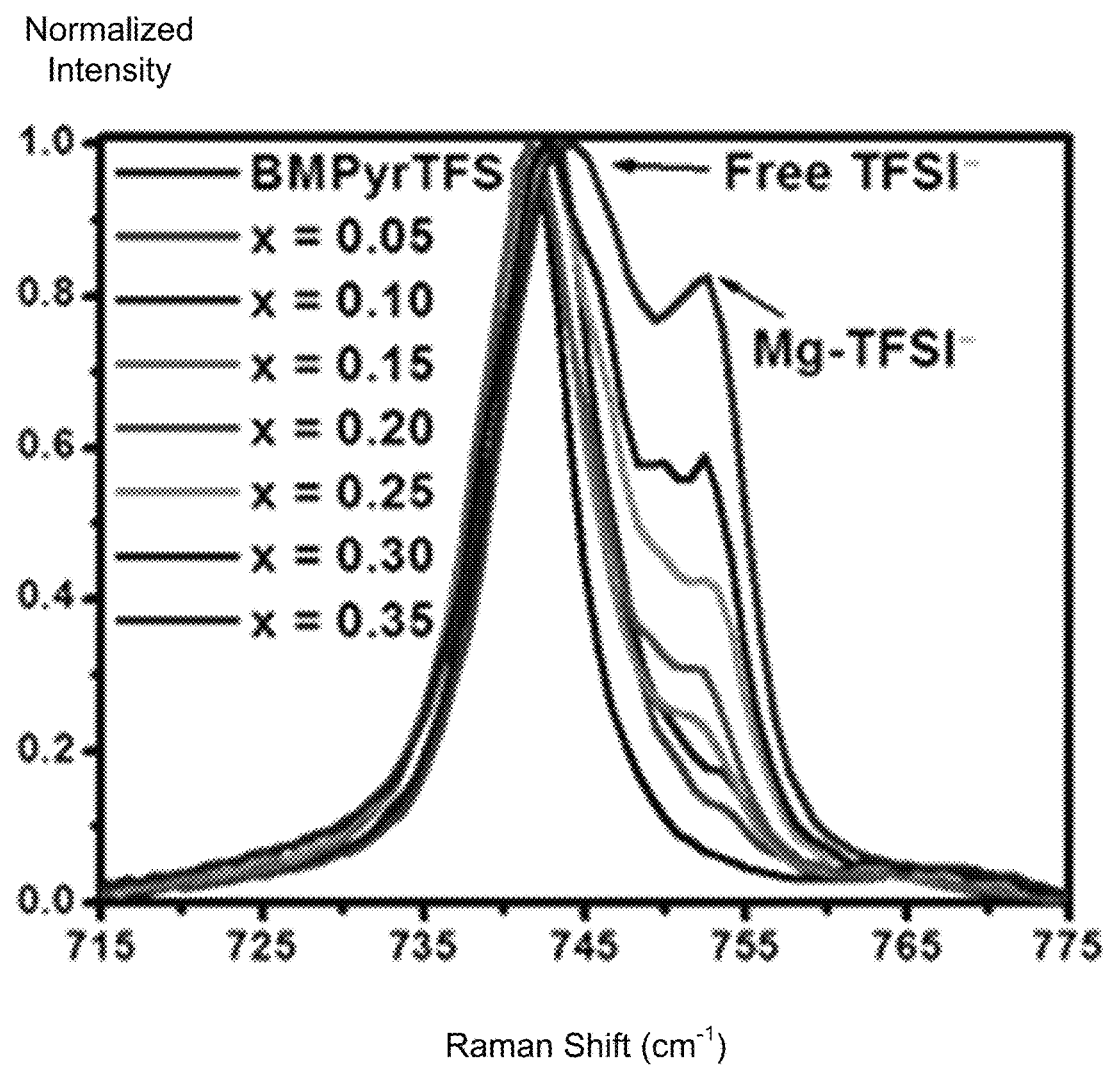
FIG. 4A illustrates Raman spectra for [Mg(BH4)2]x[BMPyrTFSI]1–x electrolytes, in accordance with various embodiments.
Figure 4B:
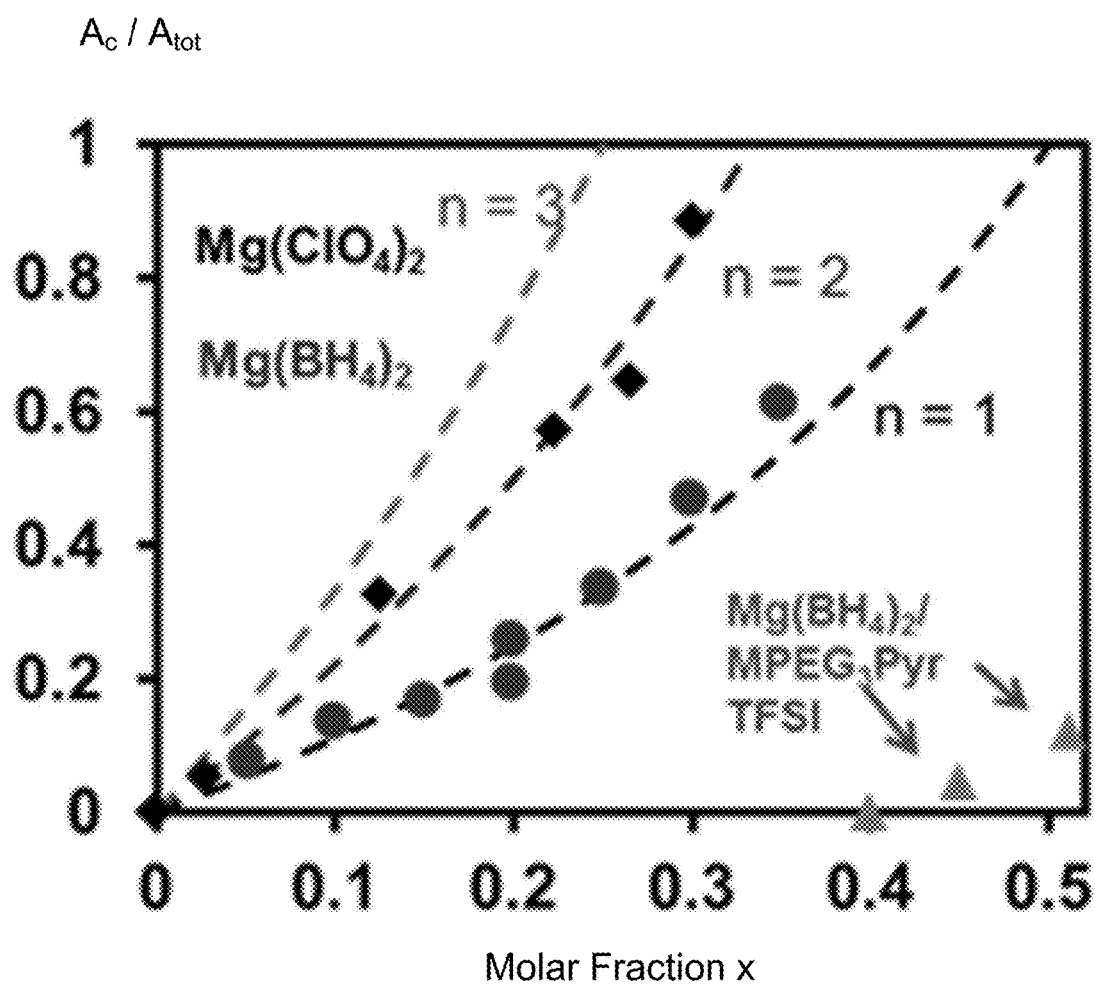
FIG. 4B illustrates fraction of TFSI— in coordination with Mg2+ (Ac/Atot) as a function of the molar fraction (x) of Mg(BH4)2 or Mg(ClO4)2 in BMPyrTFSI, and values for high concentration Mg(BH4)2/MPEG3PyrTFSI electrolytes, in accordance with various embodiments.

FIG. 4A and FIG. 4B illustrate the coordination of TFSI— at Mg2+ in various ionic liquids. For example a band at 742 cm-1 is attributed to free (non-metal ion coordinating) TFSI—, and a band at 752 cm-1 is attributed to Mg2+ coordinated TFSI—. As shown, in FIG. 4A, the 752 cm-1 band attributed to TFSI— coordinated to Mg2+ increases as the Mg(BH4)2 mole fraction is increased in the BMPyrTFSI ionic liquid. This shows that TFSI— coordinates to Mg2+ under these conditions. FIG. 4B shows a plot derived from these data giving the fraction of coordinated TFSI— versus mole fraction of Mg(BH4)2. The data for Mg(BH4)2 agree with the n=1 curve, showing that one TFSI— coordinates to Mg2+ under these conditions. This is consistent with a speciation for Mg2+ of [Mg(BH4)2TFSI]- in this medium. This speciation is consistent with the data in FIG. 1A above showing that, under these conditions, all BH4-species are involved in bidentate contact ion pair coordination with Mg2+.

Figure 5:
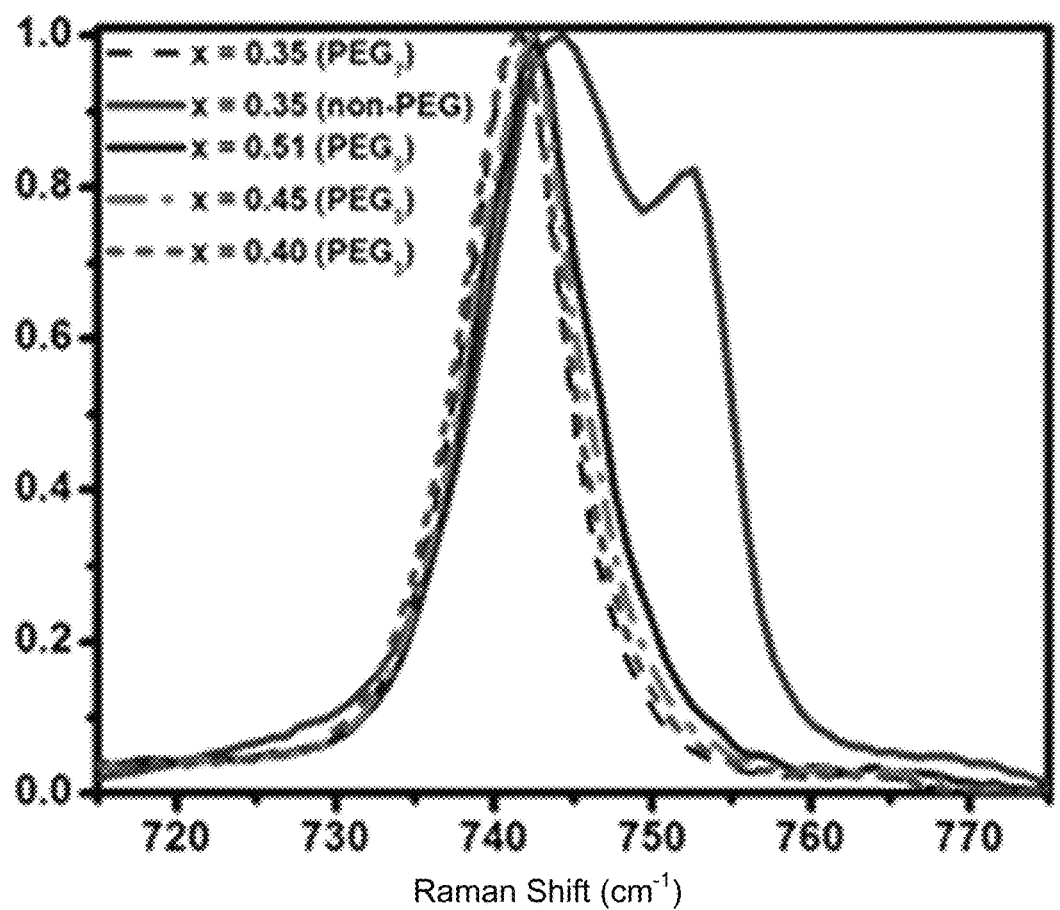
FIG. 5 illustrates Raman spectra comparing electrolytes with given mole fractions of Mg(BH4)2 in different ionic liquid systems, in accordance with various embodiments.

FIG. 5 illustrates spectra for various embodiments of the present disclosure. As shown, no evidence for coordinated TFSI— is observed for any of these cases except BMPyrTFSI, showing that higher concentrations of Mg2+ species can be obtained in these media without inducing TFSI— coordination. The suppression of TFSI— coordination at Mg2+ in these PEGylated ionic liquids provides some protection against TFSI— fragmentation under reducing conditions, which improves the electrochemical performance of Mg cycling.

Figure 6:
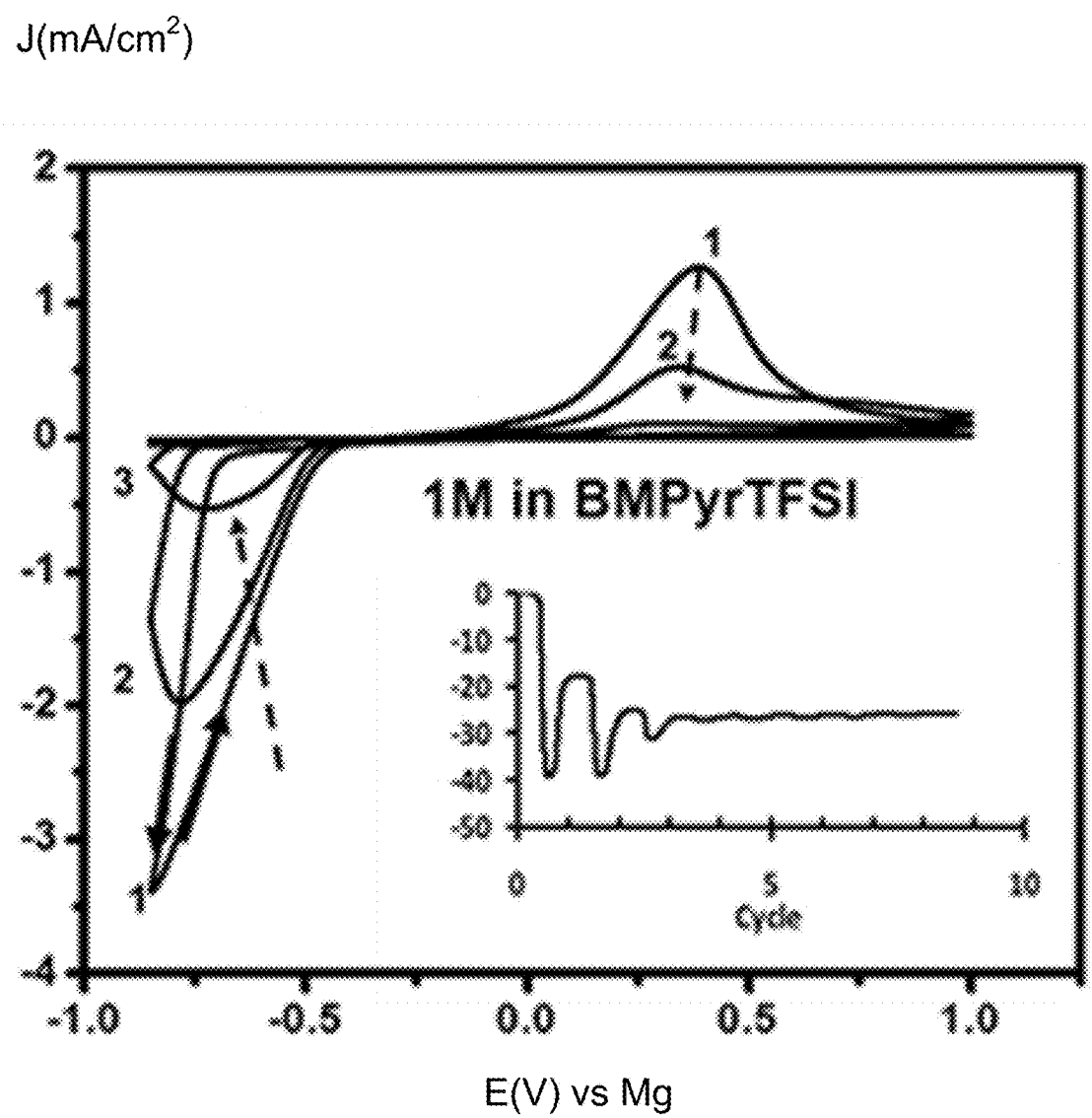
FIG. 6 illustrates successive cyclic voltammograms for 1 M Mg(BH4)2/BMPyrTFSI, at 25 mV/s, and charge as a function of the cycle number, in accordance with various embodiments.

FIG. 6 illustrates repetitive cyclic voltammograms for Mg deposition/dissolution for a solution of Mg(BH4)2 in BMPyrTFSI along with a plot of charge versus cycle number.

Figure 7A:
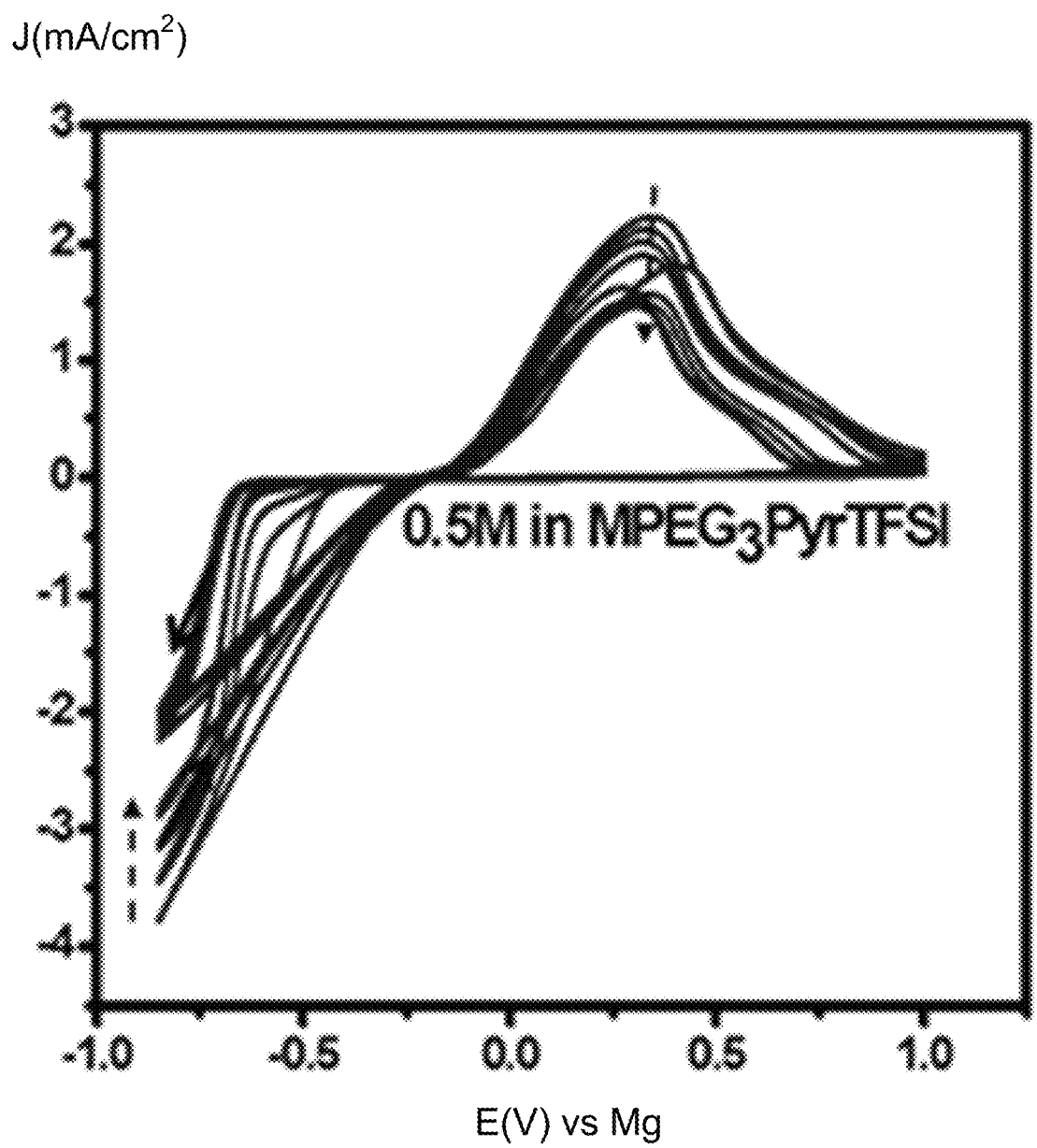
FIG. 7A illustrates successive cyclic voltammograms for 0.5 M Mg(BH4)2/MPEG3PyrTFSI, at 25 mV/s, and charge as a function of the cycle number, in accordance with various embodiments.
Figure 7B:
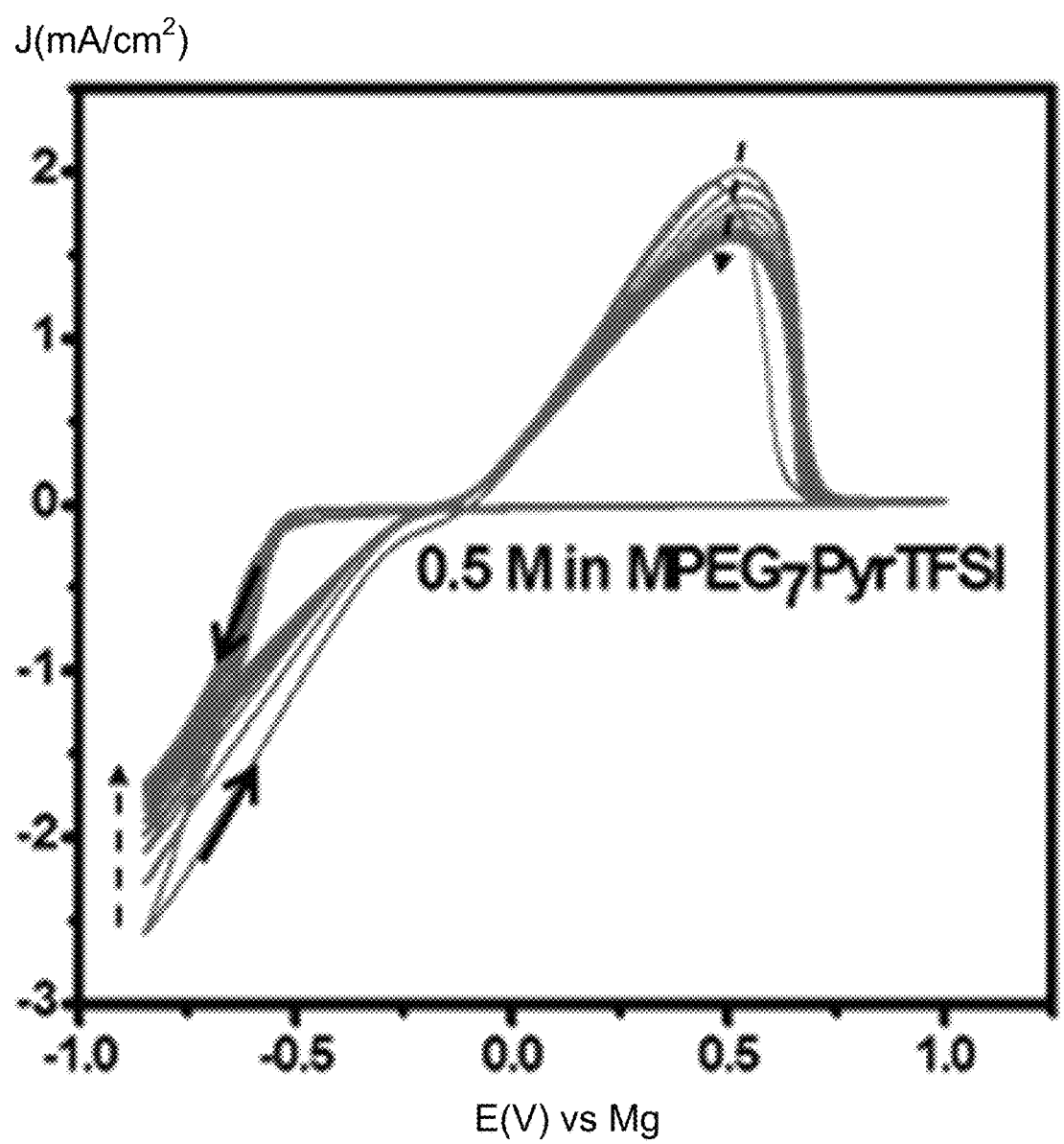
FIG. 7B illustrates successive cyclic voltammograms for 0.5 M Mg(BH4)2/MPEG7PyrTFSI at 25 mV/s, and charge as a function of the cycle number, in accordance with various embodiments.

FIGS. 7A and 7B illustrate the cyclic voltammograms for electrochemical deposition/dissolution of Mg from Mg(BH4)2 in solutions of MPEG3TFSI ionic liquid (FIG. 7A), and of MPEG7TFSI ionic liquid (FIG. 7B), along with plots of charge versus cycle number for the first ten cycles. The room temperature conductivities for these solutions were 0.5±0.1 mS/cm2, 0.38±0.01 mS/cm2 for the 1 M Mg(BH4)2/BMPyrTFSI, 0.5 M Mg(BH4)2/MPEG3PyrTFSICVs and 0.24±0.02 mS/cm2 for the 0.5 M Mg(BH4)2/MPEG7PyrTFSI.

Figure 8:
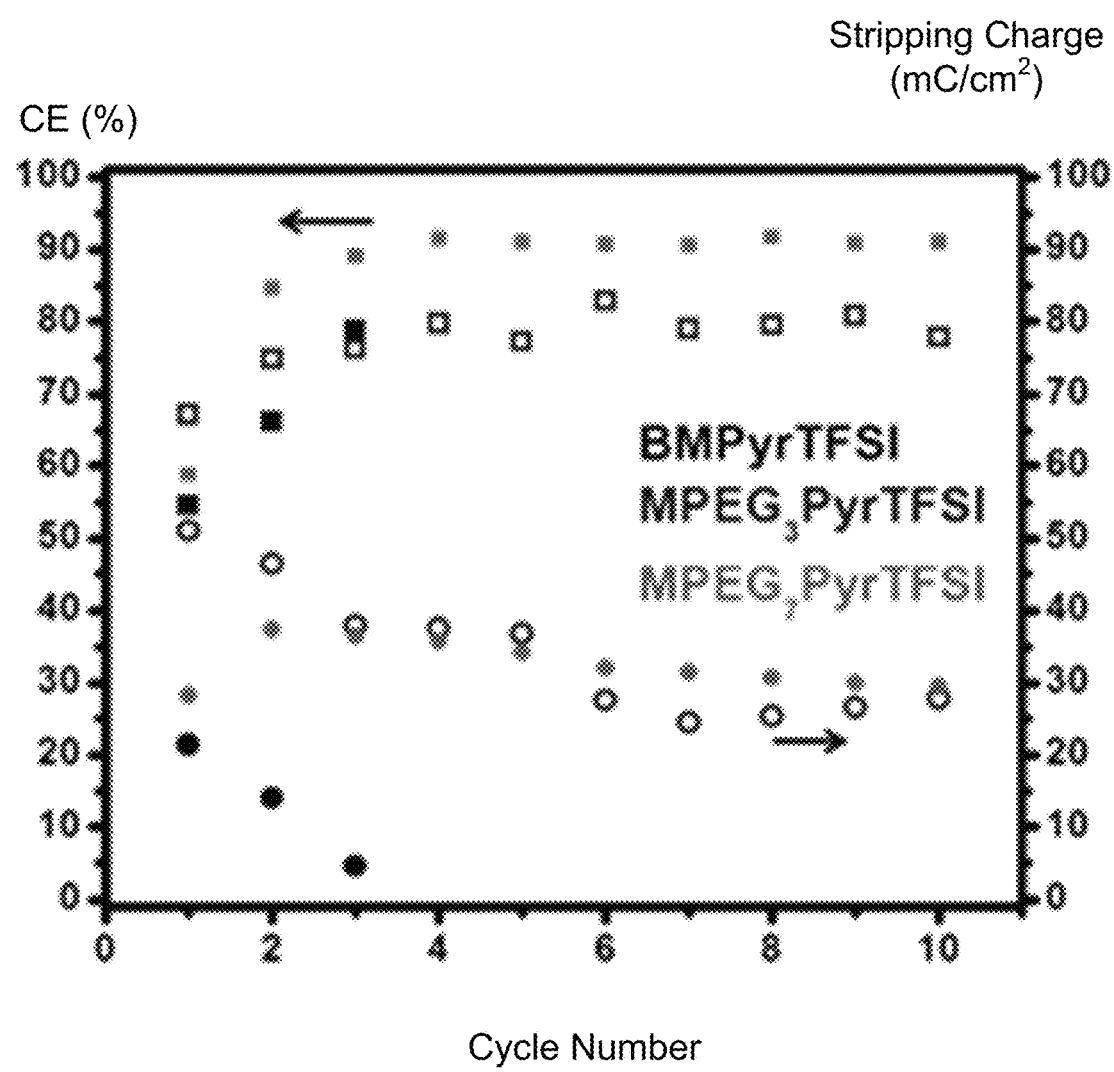
FIG. 8 illustrates coulombic efficiencies and stripping charges for each cycle in the given systems of FIGS. 6, 7A, and 7B, in accordance with various embodiments.

FIG. 8 illustrates plots of coulombic efficiency and stripping charge versus cycle number for solutions of Mg(BH4)2 in BMPyrTFSI, of Mg(BH4)2 in MPEG3TFSI ionic liquid, and of Mg(BH4)2 in MPEG7TFSI ionic liquid. These results indicate an improvement in reversibility of the deposition process. In various embodiments, application of principles of the present disclosure may result in unexpected results, including improved electrochemical performance and increased coulombic efficiency. Increased coulombic efficiency may be due to displacement of TFSI— from the Mg2+ center to prevent unwanted reactions of TFSI—. Increased coulombic efficiency may be due to the elimination of trace water in the electrolyte. Increased coulombic efficiency may be due to production of cationic speciation for Mg2+ and the favorable impact of this on transport, facilitating electromigration toward the Mg electrode under deposition conditions and away from it under dissolution conditions.

Figure 9:
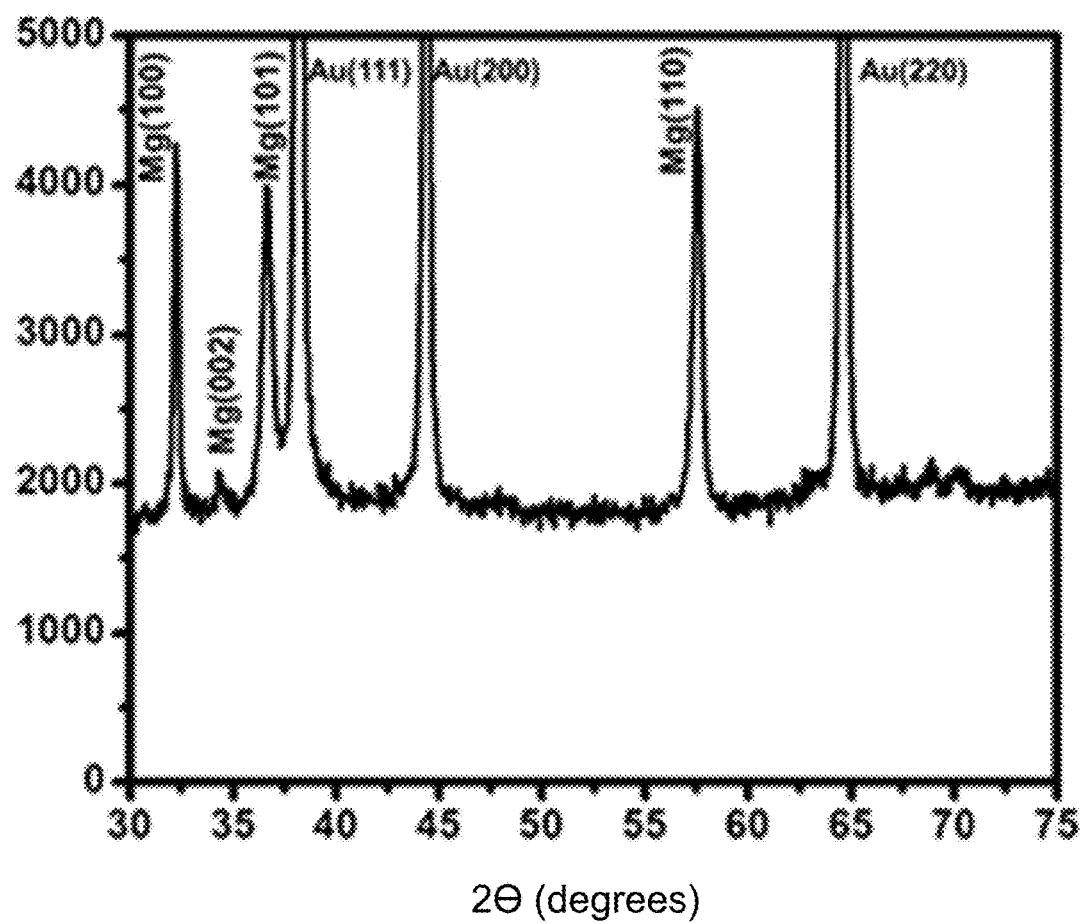
FIG. 9 illustrates an x-ray diffraction (XRD) pattern showing Mg deposit and Au substrate peaks, in accordance with various embodiments.

FIG. 9 illustrates XRD for the deposit under conditions of an exemplary embodiment used in a solution of Mg(BH4)2 in MPEG7TFSI ionic liquid. The XRD pattern reveals the Mg(002) diffraction peak is much weaker than the Mg(100), Mg(101) and Mg(110) peaks. The Au Kα peaks from the substrate are far more intense than the Mg peaks and are cut off before their respective peak intensities. The XRD demonstrates deposition of metallic Mg, with no evidence for other phases being present.

FIGS. 10A, 10B, and 10C illustrate successively closer views of an exemplary deposit obtained by SEM. FIG. 10C gives a good representation of the Mg surface morphology which appears to be relatively smooth, without sign of dendritic growths. FIG. 10D illustrates the EDS spectrum from an area in which no underlying Au substrate is exposed. A very strong Mg peak is observed along with a very weak O peak from the native oxide on the Mg surface, consistent with Mg deposition and absence of oxide precipitation or competing reduction processes such as TFSI— reduction, which leads to surface fouling.

Figure 11A:
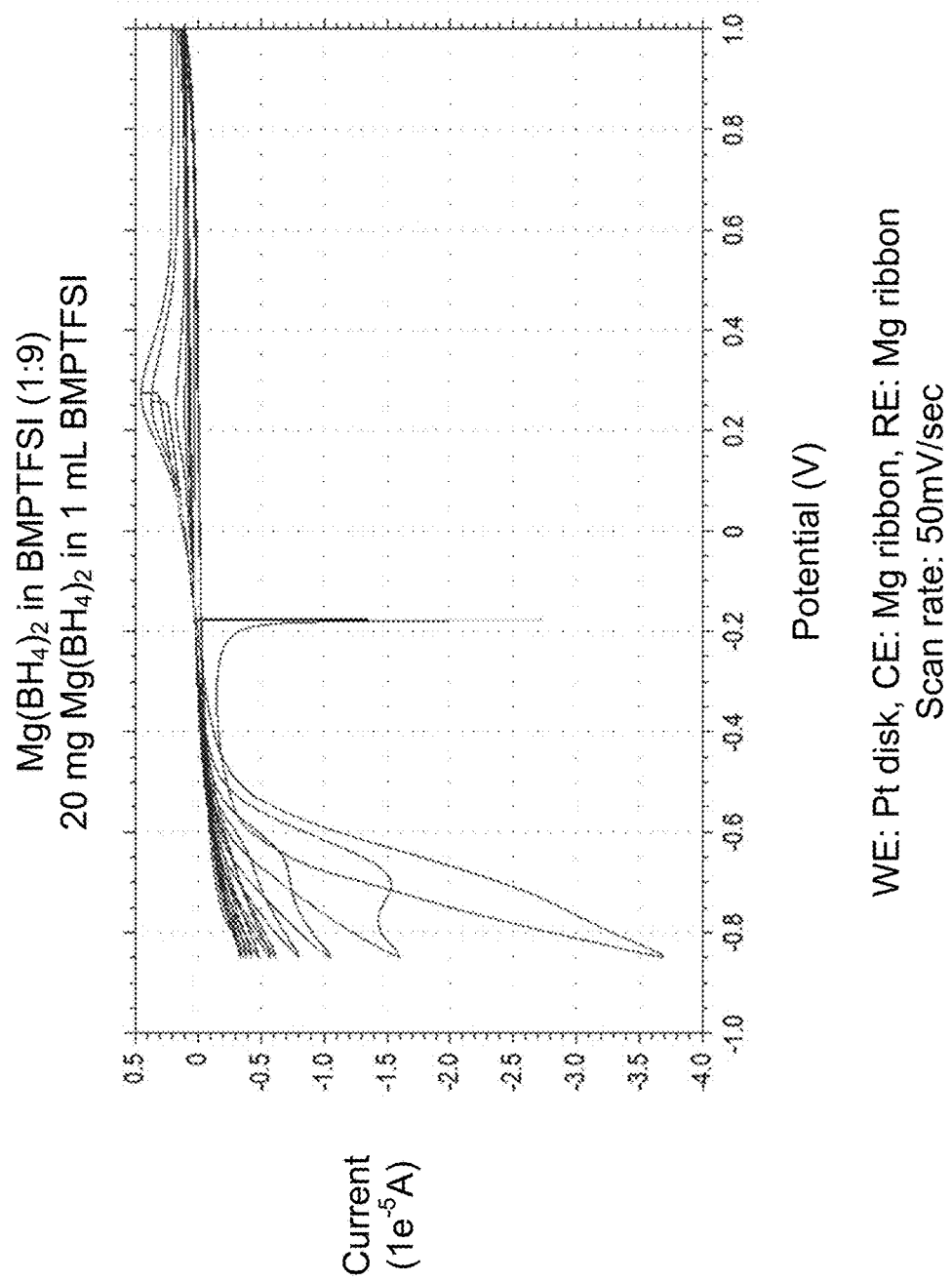
FIG. 11A illustrates successive cyclic voltammograms for 20 mg Mg(BH4)2 in 1 mL BMPyrTFSI, at 50 mV/s, in accordance with the prior art.
Figure 11B:
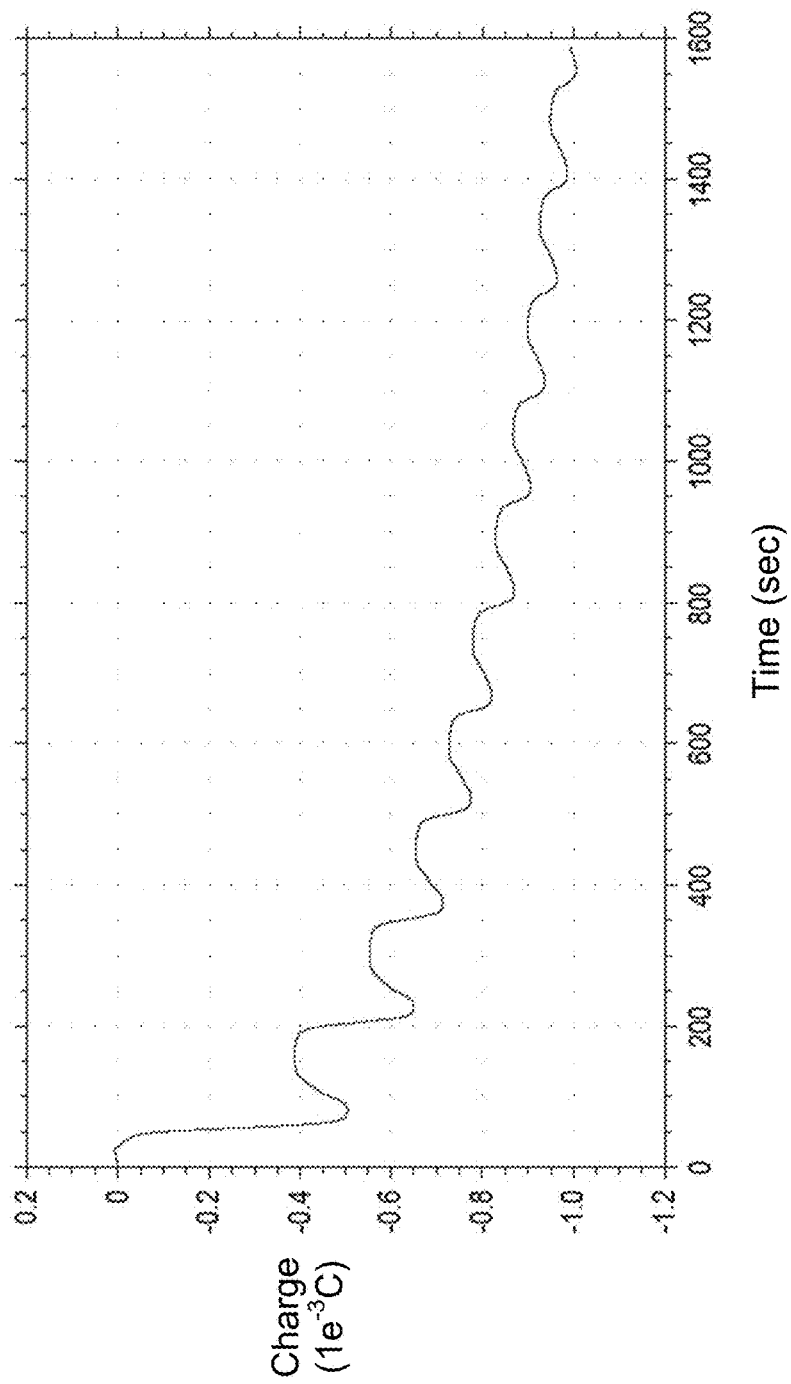
FIG. 11B illustrates charge as a function of the cycle number for 20 mg Mg(BH4)2 in 1 mL BMPyrTFSI, at 50 mV/s, in accordance with the prior art.

FIG. 11A illustrates the cyclic voltammogram for electrochemical deposition/dissolution of 20 mg Mg in 1 mL BMPryTFSI, a typical ionic liquid. FIG. 11B illustrates the accumulated charge for the continuous sequence of dissolution and deposition cycles shown in FIG. 11A as a function of the cycle number. These figures indicate that the charge per cycle decreases with cycle number and the total accumulated reductive charge increases with cycle number, leading to low coulombic efficiency and preventing reversible cycling of the anode. Referring to FIG. 11B, on the first deposition, the charge decreases from about 0 to about −0.5 millicoulomb (mC). Reductive charge accumulation stops at around 80 seconds. At this point the cycle is at positive potentials, so Mg dissolution should be happening. In a perfectly reversibly dissolution, the oxidative charge should go back to zero. However, FIG. 11B shows charge reversal to a cumulative charge of around −0.4 mC. Thus, about 0.1 mC of the 0.5 mC reductive charge is reversibly extracted (giving a coulombic efficiency of about 20%).

Figure 12A:
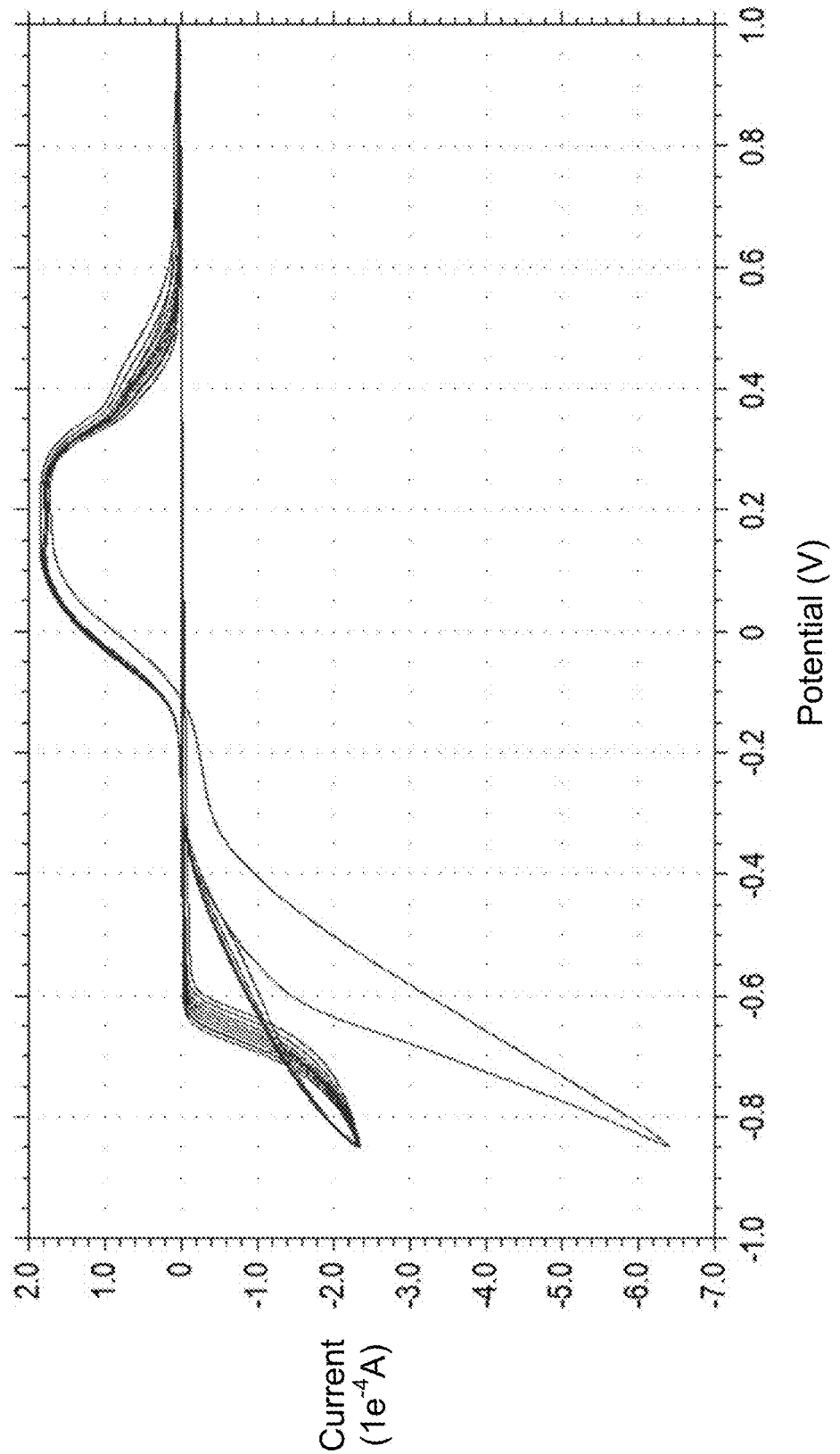
FIG. 12A illustrates successive cyclic voltammograms for 20 mg Mg(BH4)2 and 67 µL diglyme in 1 mL BMPyrTFSI, at 50 mV/s, in accordance with various embodiments.
Figure 12B:
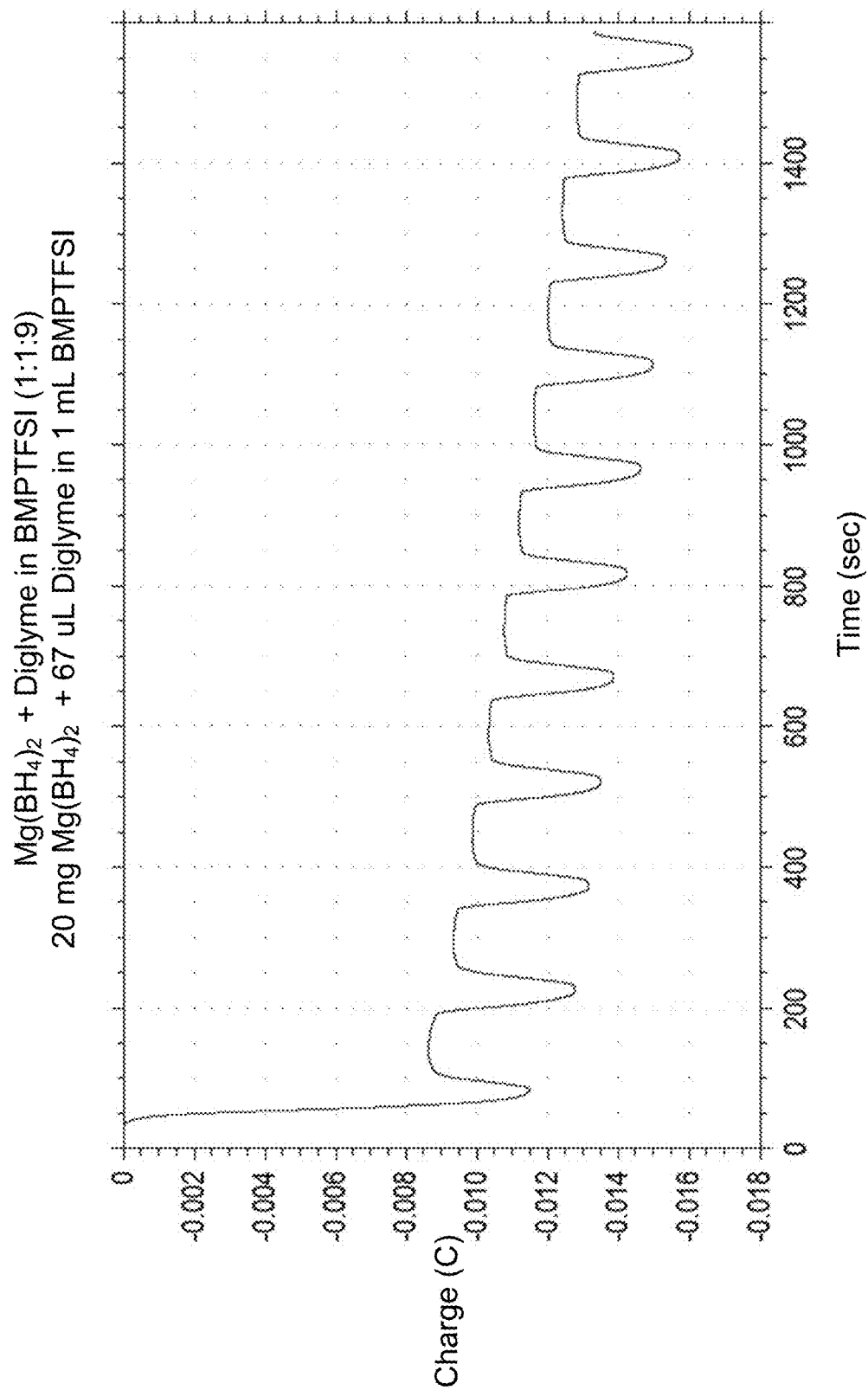
FIG. 12B illustrates charge as a function of the cycle number for 20 mg Mg(BH4)2 and 67 µL diglyme in 1 mL BMPyrTFSI, at 50 mV/s, in accordance with various embodiments.

FIG. 12A illustrates the cyclic voltammogram for electrochemical deposition/dissolution of 20 mg Mg in 1 mL BMPryTFSI, with the addition of 67 μL diglyme. FIG. 12B illustrates the accumulated charge for the continuous sequence of dissolution and deposition cycles shown in FIG. 12A as a function of the cycle number. These figures demonstrate improved coulombic efficiency over the prior art. Moreover, the maximum charge per cycle does not change significantly after the first reductive scan and the total accumulated change increase at a rate slower than the prior art. In various embodiments, the diglyme may complex with Mg2+ and/or the Mg2+ intermediate, which is produced during reduction of Mg2+ by a first electron. This complexation may inhibit the reaction of Mg+ with electrolyte components, such as TFSI; such complexation may lead to decomposition of the electrolyte, fouling of electrode surfaces, and/or irreversible charge loss during cycling.

Figure 13A:
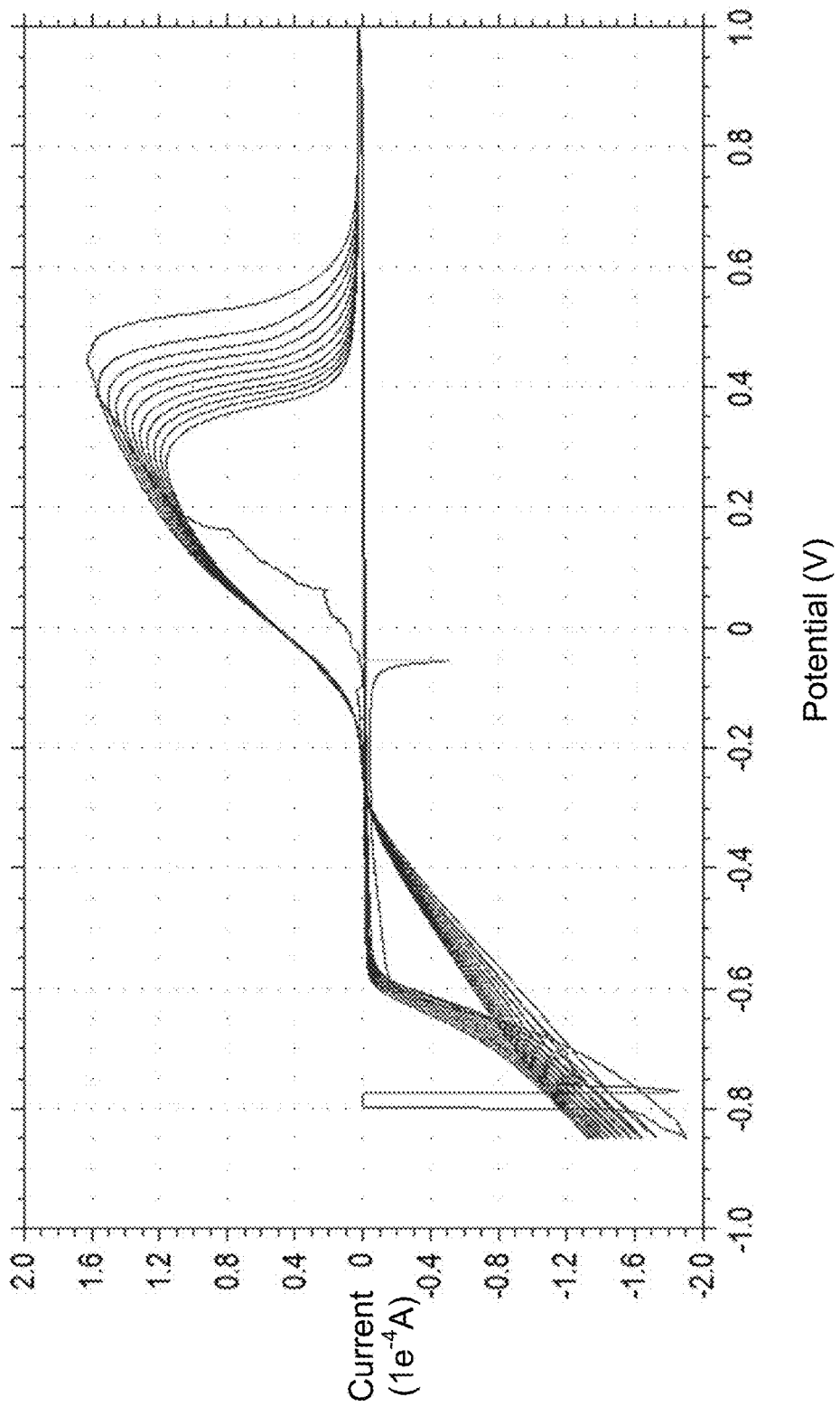
FIG. 13A illustrates successive cyclic voltammograms for 20 mg Mg(BH4)2, 67 µL diglyme, and 8 mg LiBH4, in 1 mL BMPyrTFSI, at 50 mV/s, in accordance with various embodiments.
Figure 13B:
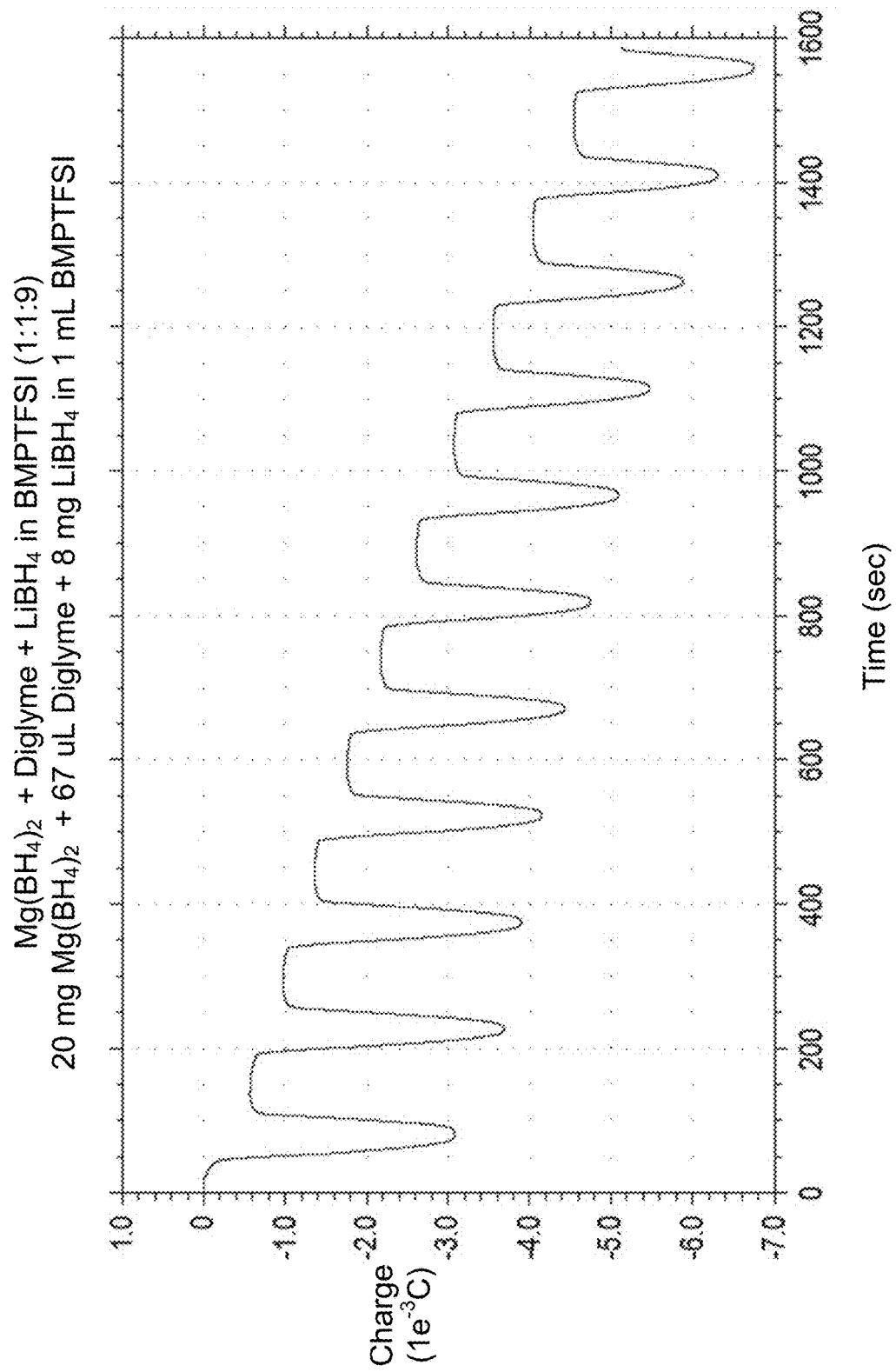
FIG. 13B illustrates charge as a function of the cycle number for 20 mg Mg(BH4)2, 67 µL diglyme, and 8 mg LiBH4, in 1 mL BMPyrTFSI, at 50 mV/s, in accordance with various embodiments.

FIG. 13A illustrates the cyclic voltammogram for electrochemical deposition/dissolution of 20 mg Mg in 1 mL BMPryTFSI, with the addition of 67 μL diglyme and 8 mg of LiBH4. FIG. 13B illustrates the accumulated charge for the continuous sequence of dissolution and deposition cycles shown in FIG. 13A as a function of the cycle number. These figures demonstrate a decrease, as compared to the prior art, in the loss of reductive charge during the first cycle.

Figure 14A:
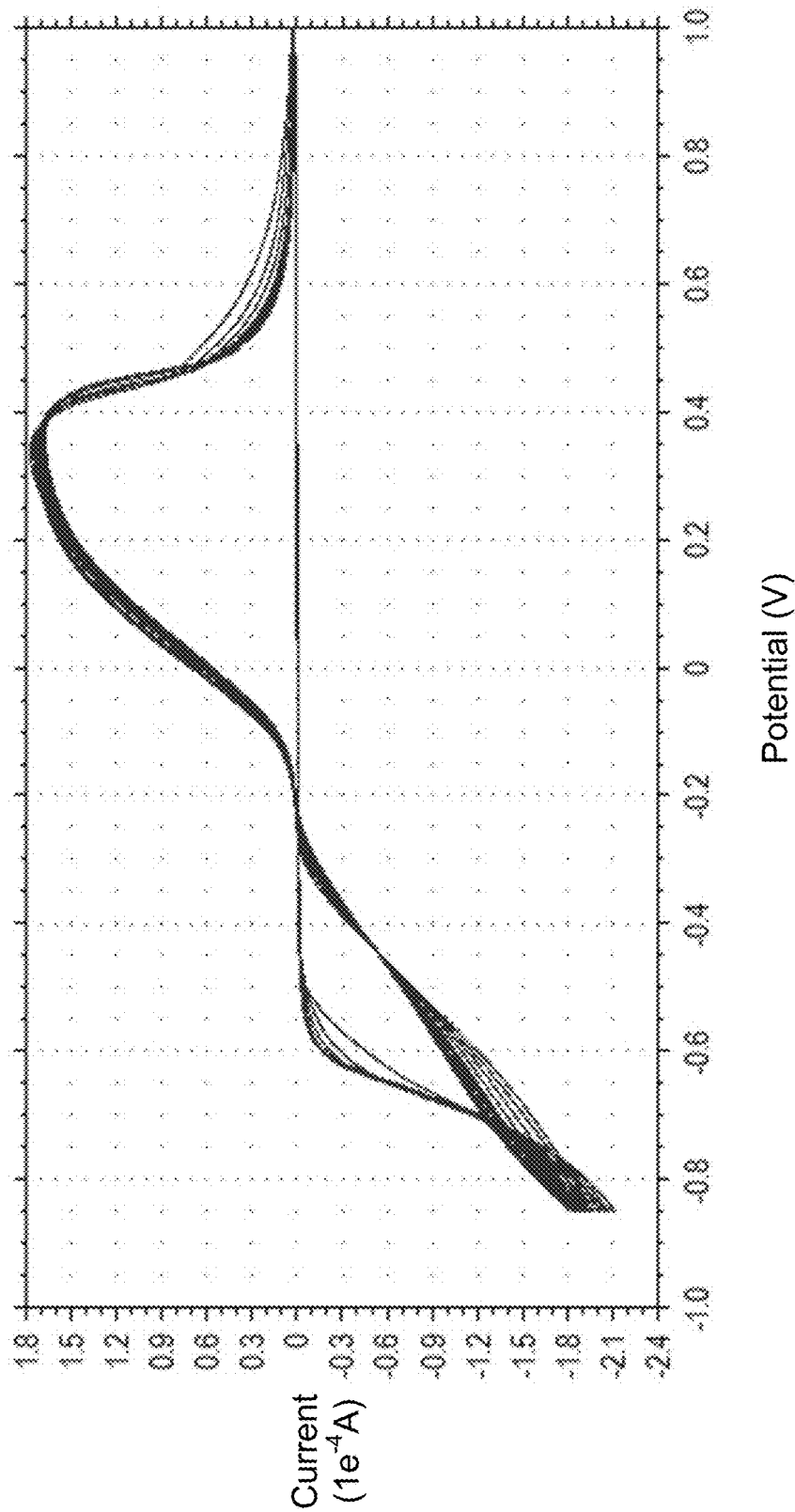
FIG. 14A illustrates successive cyclic voltammograms for 20 mg Mg(BH4)2, 67 µL diglyme, and 50 mg Bu4NBH4, in 1 mL BMPyrTFSI, at 50 mV/s, in accordance with various embodiments.
Figure 14B:
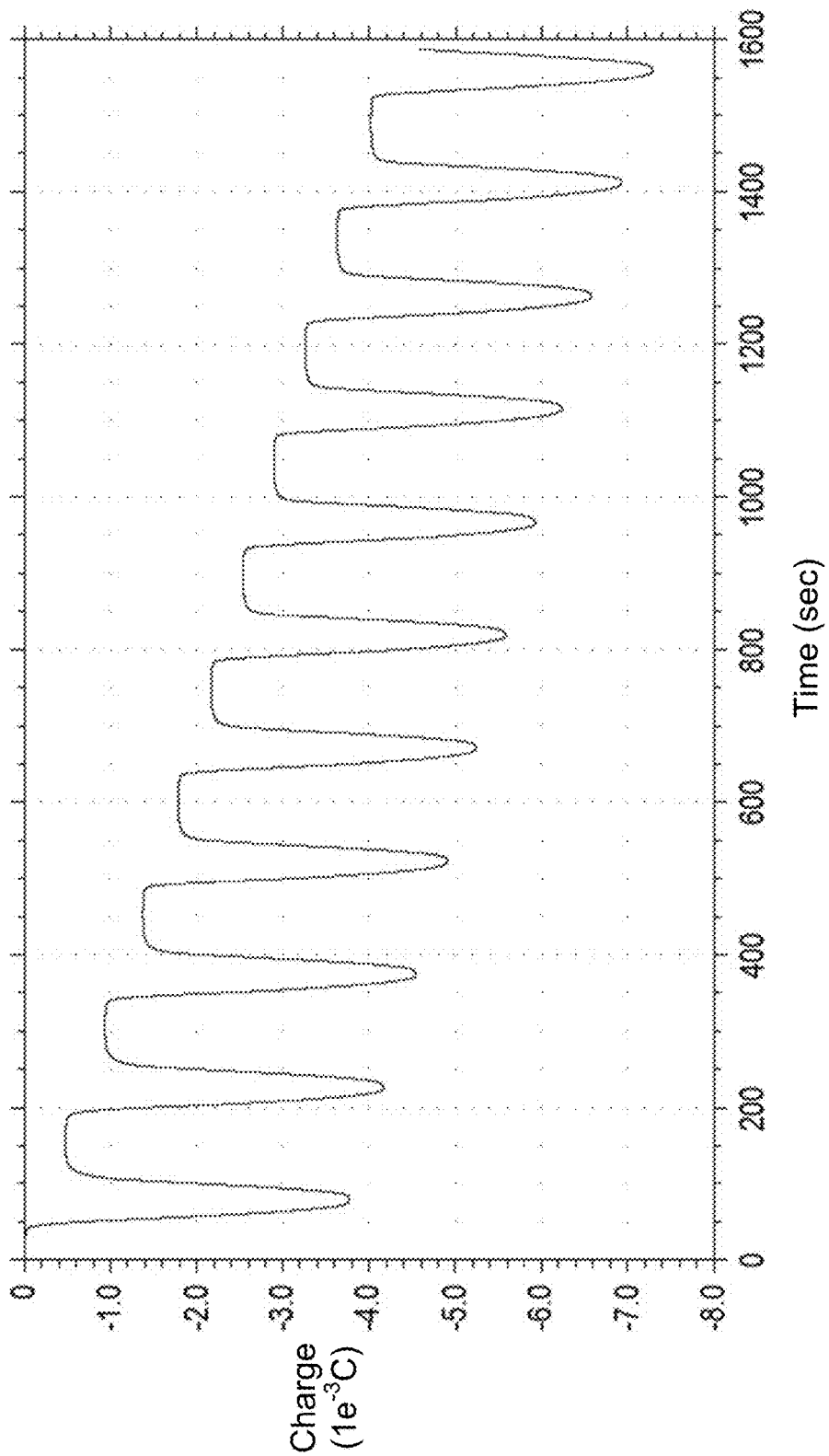
FIG. 14B illustrates charge as a function of the cycle number for 20 mg Mg(BH4)2, 67 µL diglyme, and 50 mg Bu4NBH4, in 1 mL BMPyrTFSI, at 50 mV/s, in accordance with various embodiments.

FIG. 14A illustrates the cyclic voltammogram for electrochemical deposition/dissolution of 20 mg Mg in 1 mL BMPryTFSI, with the addition of 67 μL diglyme and 50 mg Bu4NBH4. FIG. 14B illustrates the accumulated charge for the continuous sequence of dissolution and deposition cycles shown in FIG. 14A as a function of the cycle number. These figures demonstrate a decrease, as compared to the prior art, in the loss of reductive charge during the first cycle.

Referring now to FIGS. 13A, 13B, 14A, and 14B, in various embodiments, the cation of the borohydride salt may not be chemically involved in the processes that inhibit loss of initial reductive charge. In various embodiments, the anion, for example borohydride, may act as a water scavenger. In various embodiments, the electrolyte may contain trace levels of water. Water may also be a contaminant in a salt, solvent and/or other chemical component of a magnesium battery. In various embodiments, this water reacts with Mg metal that has been electrodeposited. This reaction may produce magnesium oxide (MgO). In various embodiments, production of MgO at the Mg metal interface may cause passivation of the interface, with this passivation leading to loss of charge recovery during cycling. In various embodiments, the presence of an anion, such as borohydride, may decrease the water concentration to extremely low levels, thereby preventing the undesirable loss of reductive charge. Accordingly, in various exemplary embodiments, exemplary ionic liquids may be configured with a concentration of added BH4- of between about 10 ppm (for example, for use in connection with extremely dry supporting electrolyte media) and about 1,000 ppm (i.e., near the saturation concentration of water in exemplary ionic liquids).

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A rechargeable magnesium battery, comprising:
    an anode electrode, a cathode electrode, and a chelating ionic liquid solution in contact with the anode electrode and the cathode electrode, the chelating ionic liquid comprising:
    at least one cation, wherein the cation comprises N-methoxyPEGm-N-methylpyrrolidinium cations, wherein PEG comprises a polyethylene glycol chain, and m comprises the number of ether oxygen's in the PEG chain;
    at least one anion; and
    at least one, soluble, magnesium salt represented by the formula $MgX_2$, wherein X comprises at least one of Cl—, Br—, I—, TFSI—, FSI—, $ClO_4$—, $BF_4$—, $PF_6$—, $RSO_3$— (wherein R consists of at least one of an alkyl or aryl group), $RCO_2$— (wherein R consists of at least one of an alkyl or aryl group), alkyl borides, alkyl borates, $AlCl_4$—, $AlX_aR_b$— (wherein the sum of subscripts a and b is 4, X consists of a halide, and R consists of at least one of an alkyl or aryl group), carboranes, or hexamethyldisilazide.

2. The rechargeable magnesium battery of claim 1, wherein the chelating ionic liquid further comprises a polyether chain.

3. The rechargeable magnesium battery of claim 2, wherein a concentration of oxygen atoms in the polyether chain comprises a molar ratio of between 3 and 6 per Mg2+ atom in the chelating ionic liquid.

4. The rechargeable magnesium battery of claim 2, wherein the polyether chain comprises diglyme.

5. The rechargeable magnesium battery of claim 2, wherein the polyether chain comprises a pendant chain coupled to the cation.

6. The rechargeable magnesium battery of claim 1, wherein the anion comprises at least one of bis(trifluoromethylsulfonyl)imide (TFSI), bis(fluorosulfonyl)imide (FSI—), $IIIX_4$— (III=B, Al, Ga, In; X=H, F, Cl, Br, I), $AF_6$— (A=P, As, Sb), imidazole-based anions, sulfonate-based anions, carboxylate-based anions, borate-based anions, carborane-based anions, or cyanamide-based anions.

7. The rechargeable magnesium battery of claim 6, wherein a concentration of $BH_4$— is at least as high as a concentration of water in the chelating ionic liquid.

8. An electrolyte, comprising:
    at least one cation, wherein the cation comprises N-methoxyPEGm-N-methylpyrrolidinium cations, wherein PEG comprises a polyethylene glycol chain, and m comprises the number of ether oxygen's in the PEG chain;
    at least one anion; and
    at least one, soluble, magnesium salt represented by the formula $MgX_2$, wherein X comprises at least one of Cl—, Br—, I—, TFSI—, FSI—, $ClO_4$—, $BF_4$—, $PF_6$—, $RSO_3$— (wherein R consists of at least one of an alkyl or aryl group), $RCO_2$— (wherein R consists of at least one of an alkyl or aryl group), alkyl borides, alkyl borates, $AlCl_4$—, $AlX_aR_b$— (wherein the sum of subscripts a and b is 4, X consists of a halide, and R consists of at least one of an alkyl or aryl group), carboranes, or hexamethyldisilazide.

9. The electrolyte of claim 8, further comprising a polyether chain.

10. The electrolyte of claim 9, wherein a concentration of oxygen atoms in the polyether chain comprises a molar ratio of between 3 and 6 per Mg2+ atom in the chelating ionic liquid.

11. The electrolyte of claim 9, wherein the polyether chain comprises diglyme.

12. The electrolyte of claim 9, wherein the polyether chain comprises a pendant chain coupled to the cation.

13. The electrolyte of claim 8, wherein the anion comprises at least one of bis(trifluoromethylsulfonyl)imide (TFSI), bis(fluorosulfonyl)imide (FSI—), $IIIX_4$— (III=B, Al, Ga, In; X=H, F, Cl, Br, I), $AF_6$— (A=P, As, Sb), imidazole-based anions, sulfonate-based anions, carboxylate-based anions, borate-based anions, carborane-based anions, or cyanamide-based anions.

14. The electrolyte of claim 13, wherein a concentration of $BH_4-$ is at least as high as a concentration of water in the chelating ionic liquid.

15. An electrolyte comprising:
   at least one chelating ionic liquid comprising:
      N-methoxyPEGm-N-methylpyrrolidinium cations, wherein PEG comprises a polyethylene glycol chain, and m comprises the number of ether oxygen's in the PEG chain; and
      at least one of bis(trifluoromethylsulfonyl)imide (TFSI), bis(fluorosulfonyl)imide (FSI—), $IIIX_4-$ (III=B, Al, Ga, In; X=H, F, Cl, Br, I), $AF_6-$ (A=P, As, Sb), imidazole-based anions, sulfonate-based anions, carboxylate-based anions, borate-based anions, carborane-based anions, or cyanamide-based anions; and
   at least one magnesium salt represented by the formula $MgX_2$, wherein X comprises at least one of Cl—, Br—, I—, TFSI—, FSI—, $ClO_4-$, $BF_4-$, $BH_4-$, $PF_6-$, $RSO_3-$ (wherein R consists of at least one of an alkyl or aryl group), $RCO_2-$ (wherein R consists of at least one of an alkyl or aryl group), alkyl borides, alkyl borates, $AlCl_4-$, $AlX_aR_b-$ (wherein the sum of subscripts a and b is 4, X consists of a halide, and R consists of at least one of an alkyl or aryl group), or hexamethyldisilazide.

16. The electrolyte of claim 15, wherein the at least one magnesium salt is dissolved in the chelating ionic liquid.

* * * * *

UNITED STATES PATENT AND TRADEMARK OFFICE
CERTIFICATE OF CORRECTION

PATENT NO. : 10,147,971 B2  
APPLICATION NO. : 15/942741  
DATED : December 4, 2018  
INVENTOR(S) : Daniel Buttry et al.

It is certified that error appears in the above-identified patent and that said Letters Patent is hereby corrected as shown below:

On the Title Page

On the second page, as part of item (60) Related U.S. Application Data, please insert the following text after the existing text: --, provisional application No. 62/240,678, filed on October 13, 2015.--

Signed and Sealed this
Fifteenth Day of January, 2019

Andrei Iancu
*Director of the United States Patent and Trademark Office*